(12) United States Patent
Liang

(10) Patent No.: US 9,516,154 B2
(45) Date of Patent: Dec. 6, 2016

(54) APPARATUS AND METHOD FOR MANAGING CONVERSATIONAL CONTENTS WITH CONTACTS IN A TERMINAL

(71) Applicant: Samsung Electronics Co., Ltd., Suwon-si, Gyeonggi-do (KR)

(72) Inventor: Jiayan Liang, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 14/602,688

(22) Filed: Jan. 22, 2015

(65) Prior Publication Data
US 2015/0312401 A1 Oct. 29, 2015

(30) Foreign Application Priority Data

Apr. 28, 2014 (CN) .......................... 2014 1 0175359

(51) Int. Cl.
*H04M 1/725* (2006.01)
*H04W 8/18* (2009.01)
(Continued)

(52) U.S. Cl.
CPC .......... *H04M 1/72552* (2013.01); *H04L 51/16* (2013.01); *H04L 51/28* (2013.01);
(Continued)

(58) Field of Classification Search
CPC .... H04M 1/72552; H04W 4/12; H04W 8/183; H04L 51/28; H04L 51/16; H04L 51/22; G06Q 10/10
See application file for complete search history.

(56) References Cited

U.S. PATENT DOCUMENTS 7,308,453 B2 12/2007 Powell
2004/0015547 A1 1/2004 Griffin et al.
(Continued)

FOREIGN PATENT DOCUMENTS

CN 1622661 A 6/2005
CN 101351000 A 1/2009
(Continued)

OTHER PUBLICATIONS

Samsung Galaxy Note II User Manual, URL:http://www.att.com/support_static_files/manuals/Samsung_Galaxy_Note_II_I317.pdf, Jan. 1, 2012, p. 78, paragraph Section 5: Contacts and Your Address Book—p. 125, paragraph Section 7: Messaging, XP055156707.

*Primary Examiner* — Brandon Miller
(74) *Attorney, Agent, or Firm* — Jefferson IP Law, LLP

(57) ABSTRACT

An apparatus and method for managing conversational content associated with a contact in a terminal are provided. The apparatus includes a storage unit configured to store contact information including a name of each of contacts and a corresponding number, a management unit configured to preserve conversational information associated with one of the contacts, which includes the corresponding number of the one contact, the one contact, a time of occurrence and a detailed content associated with each of conversational messages, and to form a conversational content with the one contact to be displayed for a user based on the contact information and the conversational information, and a display unit configured to display the conversational content with the one contact formed by the management unit for the user.

20 Claims, 22 Drawing Sheets

(51) Int. Cl.
  *H04W 4/12*  (2009.01)
  *H04L 12/58*  (2006.01)
  *G06Q 10/10*  (2012.01)
(52) U.S. Cl.
  CPC ............ *H04W 4/12* (2013.01); *H04W 8/183* (2013.01); *G06Q 10/10* (2013.01); *H04L 51/22* (2013.01)

(56) References Cited

U.S. PATENT DOCUMENTS

| | | | |
|---|---|---|---|
| 2005/0027802 A1* | 2/2005 | Madsen | G06Q 10/06 709/204 |
| 2008/0320540 A1* | 12/2008 | Brooks | H04L 41/0896 725/118 |
| 2009/0070294 A1 | 3/2009 | Chijiiwa | |
| 2014/0136638 A1* | 5/2014 | Zhang | H04L 51/04 709/206 |
| 2015/0163181 A1* | 6/2015 | Kupsh | H04L 51/10 709/206 |

FOREIGN PATENT DOCUMENTS

| | | |
|---|---|---|
| CN | 103051792 A | 4/2013 |
| CN | 103581413 A | 2/2014 |
| EP | 2 461 615 A1 | 6/2012 |
| KR | 10-0440962 B1 | 7/2004 |
| KR | 10-2004-0074564 A | 8/2004 |
| KR | 10-0762639 B1 | 9/2007 |

* cited by examiner

APPARATUS AND METHOD FOR MANAGING CONVERSATIONAL CONTENTS WITH CONTACTS IN A TERMINAL

CROSS-REFERENCE TO RELATED APPLICATION(S)

This application claims the benefit under 35 U.S.C. §119(a) of a Chinese patent application filed on Apr. 28, 2014 in the State Intellectual Property Office and assigned Serial number 201410175359.2, the entire disclosure of which is hereby incorporated by reference.

TECHNICAL FIELD

The present disclosure relates to a technique for managing conversations of contacts in a terminal. More particularly, the present disclosure relates to an apparatus and method for managing provision and display of conversational contents with contacts in a terminal.

BACKGROUND

With the development of the communication technique, people need to frequently get in touch with a large amount of contacts through a terminal, such as a mobile communication terminal, a Personal Digital Assistant (PDA), a panel computer, a Game Console (GC) and a digital multimedia player. The fact is that individual contact may often change his or her own number, and one single contact may have multiple numbers.

In related art, the number of a contact no longer has any association with the contact when the number is deleted. Accordingly, all of conversational messages with the number in the terminal are directly displayed along with a string of digits forming the number. In this case, since the user cannot remember which contact each of the deleted numbers used to belong to, it is quite difficult to find out the incoming and outgoing messages with the contacts through those numbers in the past.

FIGS. 1A and 1B illustrate an example of a conversation display screen when a number of a contact is deleted according to the related art. In the conversation display screen as shown in FIG. 1, entry messages of various conversations are illustrated. As shown in FIG. 1A, contact Andy has two different numbers. Accordingly, two conversational entry messages displayed in the first and third rows are latest conversational messages with those two numbers respectively. When one number (i.e., 1350000XXXX) of Andy is deleted from contact Andy, the conversational messages with number 1350000XXXX is immediately displayed under the digits "1350000XXXX" as shown in FIG. 1B, and the user will completely have no idea of the past relationship between the contact Andy and himself or herself. When multiple such numbers exist, it is difficult for the user to find out historical records of the conversation with the old numbers of the contacts.

Therefore, a technical solution capable of performing management on changes in the numbers of contacts in a terminal is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for managing conversational content associated with a contact in a terminal, by which a user may not feel confused due to facing lengthy digits after a number is deleted from a contact.

In accordance with an aspect of the present disclosure, an apparatus for managing conversational content associated with a contact in a terminal is provided. The apparatus includes a storage unit configured to store contact information including a name of each of contacts and a corresponding number, a management unit configured to preserve conversational information associated with one of the contacts, which includes the corresponding number of the one contact, the one contact, a time of occurrence and a detailed content associated with each of conversational messages, and to form a conversational content with the one contact to be displayed for a user based on the contact information and the conversational information, and a display unit configured to display the conversational content with the one contact formed by the management unit for the user, wherein the management unit is further configured to incorporate the conversational message associated with the corresponding number of the one contact before the corresponding number of the one contact is deleted or replaced into the conversational content associated with the one contact by processing the conversational information associated with the corresponding number before the corresponding number is deleted or replaced when the corresponding number of the one contact is deleted or replaced.

In accordance with another aspect of the present disclosure, a method for managing conversational content associated with a contact in a terminal is provided. The method includes storing, by a storage unit of the terminal, contact information including a name of each of contacts and a corresponding number, preserving conversational information associated with one of the contacts, which includes the corresponding number of the one contact, the one contact, a time of occurrence and a detailed content associated with each of conversational message, forming a conversational content with the one contact to be displayed for a user based on the contact information and the conversational information, and displaying the formed conversational content with the one contact for the user, wherein the forming of the conversational content further includes incorporating the conversational message associated with the corresponding number of the one contact before the corresponding number of the one contact is deleted or replaced into the conversational content associated with the one contact by processing the conversational information associated with the corresponding number before the corresponding number is deleted or replaced when the corresponding number of the one contact is deleted or replaced.

In accordance with another aspect of the present disclosure, an apparatus for managing conversational content associated with a contact in a terminal is provided. The apparatus includes a prompting unit configured to generate an incorporation prompting message, when a corresponding number of the contact is deleted or replaced, and to output the generated incorporation prompting message, an instruction receiving unit configured to receive an incorporating instruction for performing an incorporation after the incorporation prompting message is outputted by the prompting unit, a management unit configured to process conversational information associated with the corresponding number before the corresponding number is deleted or replaced such that a conversational message associated with the corresponding number before the corresponding number is deleted or replaced is included in the conversational content associated with the contact, when the incorporating instruction is received by the instruction receiving unit and a display unit configured to display the conversational content with the contact.

In accordance with another aspect of the present disclosure, a method for managing conversational content related to a contact in a terminal is provided. The method includes generating, by a prompting unit of the terminal, an incorporation prompting message, when a corresponding number of the contact is deleted or replaced, outputting the generated incorporation prompting message, receiving an incorporating instruction for performing an incorporation after the incorporation prompting message is outputted, processing conversational information associated with the corresponding number of the content before the corresponding number is deleted or replaced, when the incorporating instruction is received such that a conversational message associated with the corresponding number before the corresponding number is deleted or replaced is included in the conversational content associated with the contact, and displaying the conversational content with the contact.

In the conversational content managing apparatus and method according to the various embodiments of the present disclosure, contact information and conversational information with contacts are stored separately and the corresponding processes are performed based on these information. Therefore, the conversational messages with the number before the number is deleted will still be included in the conversational content with the contact. In this case, when a number of a contact changes, conversational content with the number before the number changes may still be displayed with respect to the contact, such that the user of the terminal may efficiently find out the previous conversational content with the contact.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent by the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 2 through 15C, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1A:
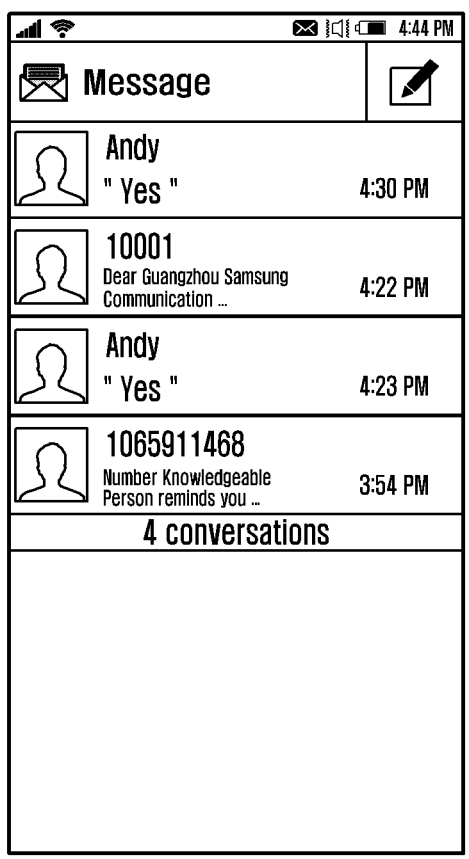
FIGS. 1A and 1B illustrate examples of a conversation display screen when a number of a contact is deleted according to the related art.
Figure 1B:
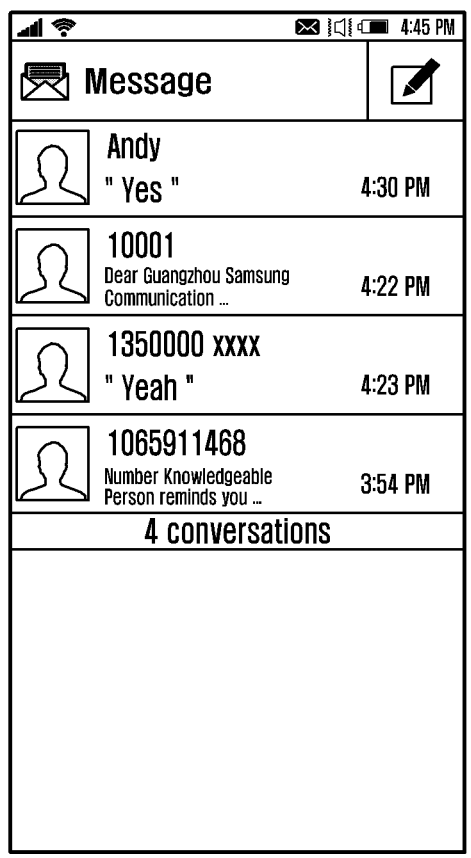
Figure 2:
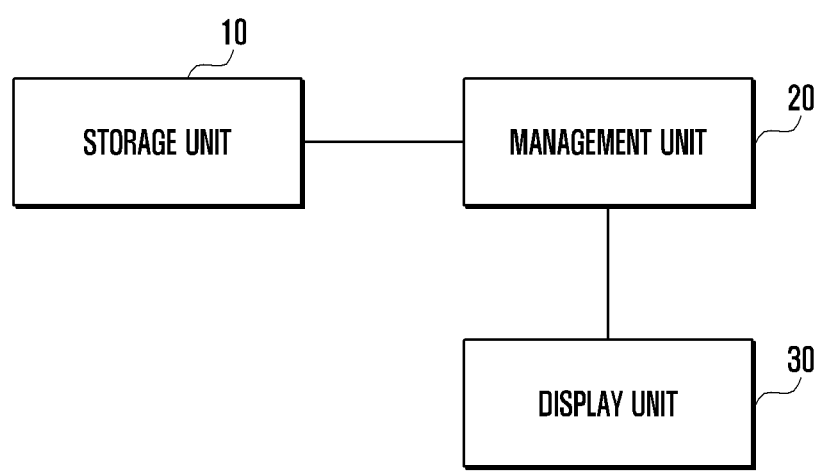
FIG. 2 illustrates a block diagram of an apparatus for managing conversational content with a contact in a terminal according to an embodiment of the present disclosure.

FIG. 2 illustrates a block diagram of an apparatus for managing conversational content with a contact in a terminal, according to an embodiment of the present disclosure.

Referring to FIG. 2, a conversational content managing apparatus according to an embodiment of the present disclosure is illustrated, where the conversational content managing apparatus includes a storage unit 10, a management unit 20 and a display unit 30. As an example, a terminal described herein may be various electronic apparatus, such as a mobile communication terminal, a panel computer, a GC, a PDA and a digital multimedia player. It is to be noted that the storage unit 10, the management unit 20 and the display unit 30 may be implemented by using one or more general-purpose hardware processors such as a digital signal processor, a microcomputer, a Field Programmable Gate Array (FPGA) or one or more special-purpose hardware processors such as Application Specific Integrated Circuit (ASIC), or implemented as software by entirely using computer programs.

In particular, the storage unit 10 is used for storing contact information including a name of each contact and corresponding number. Herein, each contact may correspond to at least one number or correspond to no number. As an example, the number described herein may be a telephone number, but the present disclosure is not limited thereto. An identification number, for example, an instant messenger number and a social network User IDentification (UID) for any form of conversation may be used as the number of the contact in the present disclosure.

The management unit 20 is used for preserving conversational information with the contact, and forming a conversational content with the contact to be displayed for a user based on the contact information and the conversational information. Herein, the conversational information includes the number, the contact, time of occurrence and a detailed content associated with each of conversational messages. When a number of a contact is deleted or replaced, the management unit 20 processes the conversational information associated with the number before the number is deleted or replaced such that conversational messages with the number before the number is deleted or replaced are included in the conversational content with the contact.

Preferably, the management unit 20 may set a specific number of the contact as a number to which a reply message for the contact is to be sent. The specific number may be the last reply-able number in a conversational message list or another number chosen by the user.

The display unit 30 is used for displaying the conversational content with the contact formed by the management unit 20 for the user. Herein, the conversational content includes a conversational entry message list which includes a latest message of respective conversation displayed when a conversational application is entered and a conversational message list which includes a record of incoming and outgoing conversational messages with a specific contact displayed when the specific contact is selected. Herein, respective items of the conversational entry message list and the conversational message list are usually arranged in a time sequence. For example, the conversational message may refer to a short message in mobile communication, and may also refer to various conversational messages, such as chat messages in an instant message application or private messages in a social network.

Figure 3:
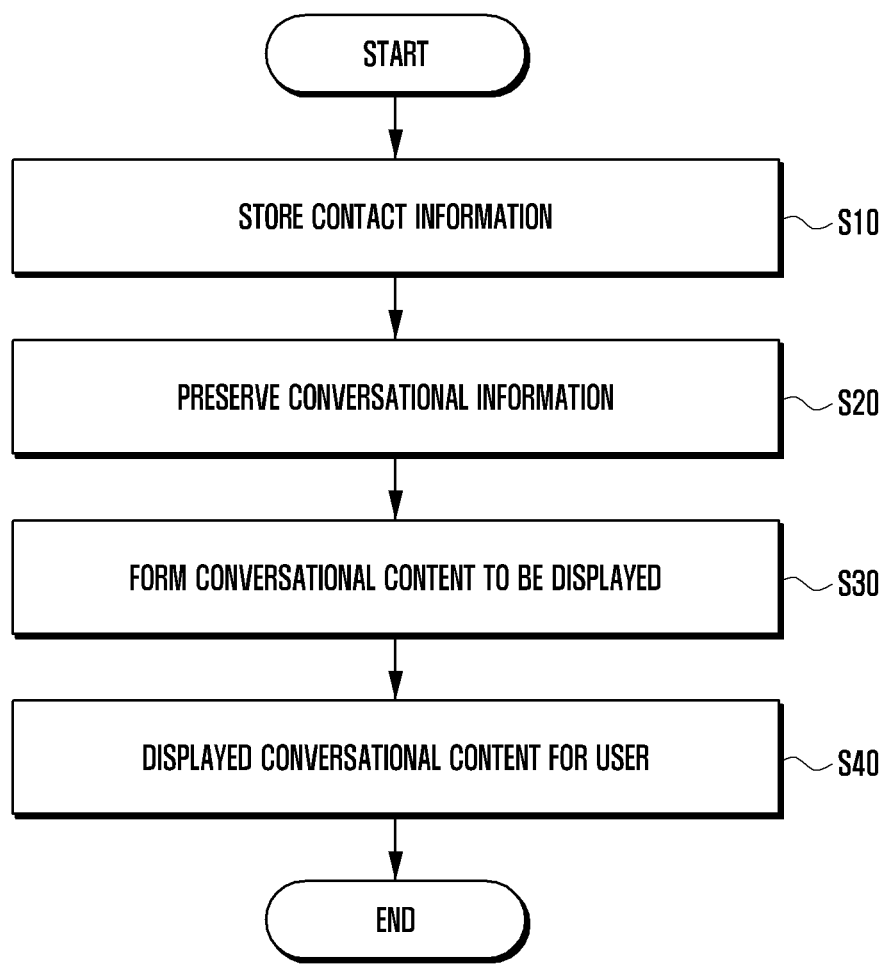
FIG. 3 illustrates a flowchart of a method for managing conversational content with a contact in a terminal according to an embodiment of the present disclosure.

FIG. 3 illustrates a flowchart of a method for managing conversation content with a contact in a terminal according to an embodiment of the present disclosure.

Referring to FIG. 3, a flowchart of a method for managing conversation content is illustrated, where contact information including a name of each contact and a corresponding number is stored by the storage unit 10 in operation S10. For example, the contact information may be stored as Table 1 shown below:

TABLE 1

The Contact Information Table

| No. | Contact Name | Number-1 | Number-2 | Number-3 | Number-4 |
|---|---|---|---|---|---|
| 1 | Andy | 1350000XXXX | 1862880XXXX | . . . | . . . |

It is to be noted that although the numbers of the contact have been showed as mobile phone numbers, the present disclosure is not limited thereto. That is, a case that the contact information table corresponds to phone book may be used as a non-limiting example only. When a number of a contact changes, the storage unit 10 will make an appropriate modification to the stored contact information.

Next, the conversational information with the contacts including a number, a contact, time of occurrence and a detailed content associated with each of the conversational messages may be preserved by the management unit 20 in operation S20. Whenever the terminal receives or transmits a conversational message, the management unit 20 preserves corresponding conversational information and updates the preserved conversational information depending on different conditions.

The conversational content with the contact to be displayed for the user is formed by the management unit 20 based on the contact information and the conversational information in operation S30. Herein, when a number of a contact is deleted or replaced, a conversational message with the number before the number is deleted or replaced is included in the conversational content with the contact by processing the conversational information associated with the number before the number is deleted or replaced by the management unit 20. Furthermore, the management unit 20 may further exclude conversational messages with the number after the number is deleted or replaced from the conversational content with the contact.

Preferably, in the process of forming the conversational content with a contact, when an old number of the contact is replaced by a new one, a conversational message with the old number before the old number is replaced and all of conversational messages with the new number may be included in the conversational content with the contact by processing conversational information associated with the old number before the old number is replaced by the management unit 20.

Thereafter, the formed conversational content with the contact is displayed for the user by the display unit 30 in operation S40.

Through the manner described above, even a certain number of a contact is deleted or replaced, the user of the terminal may still be able to easily find out conversations with the contact by using the number in the past since the conversational message with the number before the number is deleted or replaced is still included in the conversational content with the contact.

It is to be noted that the conversational content with the contact may be provided based on each number of the contact. That is, the corresponding conversational message list in which incoming and outgoing conversational messages between the user of the terminal and the number are arranged in a time sequence may be provided with respect to each number.

Furthermore, according to an embodiment of the present disclosure, the management unit 20 may incorporate conversational messages with all the numbers of a contact into a single conversational content with the contact. In this way, the situation that it is difficult to find out conversations since conversational contents with a contact by using two numbers belong to different conversation lists may not happen.

Figure 4:
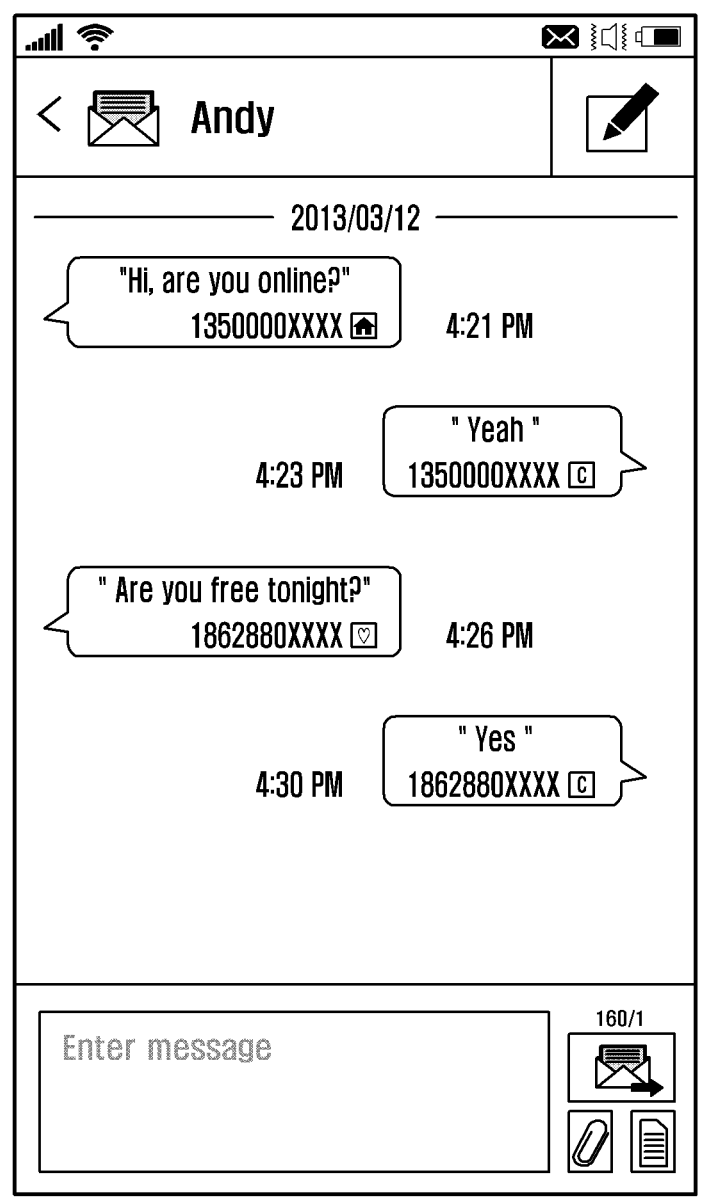
FIG. 4 illustrates an example of a conversation display screen according to an embodiment of the present disclosure.

FIG. 4 illustrates an example of a conversation display screen according to an embodiment of the present disclosure.

Referring to FIG. 4, with respect to contact Andy, a conversational display screen is illustrated, in which a management unit 20 may incorporate conversational messages with two numbers ("3150000XXXX" and "1862880XXXX") of Andy into a single conversational content. To this end, the management unit 20 may preserve conversational information with a contact by making conversational messages with all the numbers of the same contact corresponding to the same conversational identification. In this case, when the number "1350000XXXX" is deleted from contact Andy, the management unit 20 may make conversational information with the number "1350000XXXX" before the number is deleted still corresponding to the conversational identification of the contact, and may make conversational information with the number "350000XXXX" after the number is deleted no longer corresponding to the conversational identification of the contact, such that a screen similar to FIG. 4 may be displayed all the same when the conversational message list of Andy is accessed after the number "1350000XXXX" is deleted.

Furthermore, in this case, when a number of a contact is added, the management unit 20 may incorporate conversational messages with the number before the number is added into a single conversational content with the contact by processing conversational information with the number before the number is added.

As shown in FIG. 4, when conversational messages with all the numbers of the contact are incorporated into the single conversational content to be displayed, preferably, the display unit 30 may display the corresponding numbers nearby the conversational messages. Furthermore, in order to distinguish between conversational messages received from or transmitted to different numbers, the display unit 30 may display conversational messages associated with various numbers distinctively. For example, the display unit 30 may distinguish between conversational messages associated with different numbers by using different background colors, background patterns or relevant icons.

Herein, the management unit 20 may set conversational messages associated with the deleted number or the replaced old number in the single conversational content with the contact as non-reply-able status. Herein, the management unit 20 may set a number corresponding to the last message which is not in non-reply-able status arranged in the single conversational content as a number to which reply messages for the contact are to be sent, or may set a number corresponding to a message chosen by the user from all of messages arranged in the single conversational content (or a number directly chosen by the user) as the number to which reply messages for the contact are to be sent.

As described above, by incorporating conversational messages with each of numbers of a contact into single conversational content, it is possible to provide additional convenience for a user to find out the messages with the contact. Furthermore, with respect to the preferred mode, in order to process the conversational information effectively, the management unit 20 may be implemented as the structure shown in FIG. 5.

Figure 5:
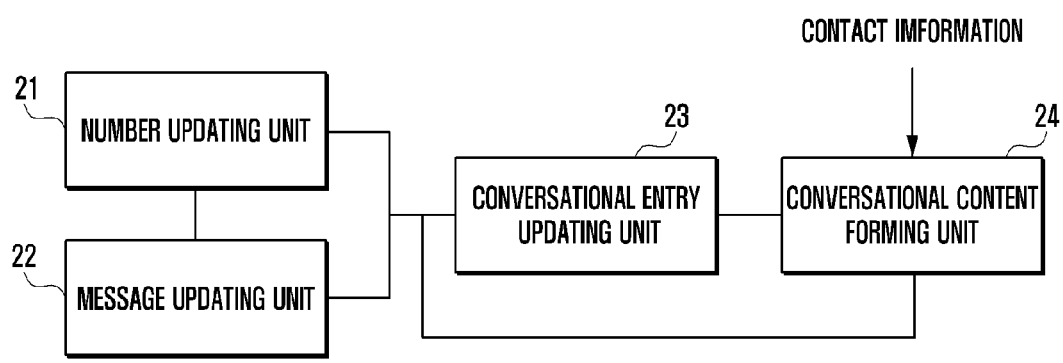
FIG. 5 illustrates a block diagram of a management unit according to an embodiment of the present disclosure.

FIG. 5 illustrates a block diagram of a management unit according to an embodiment of the present disclosure.

Referring to FIG. 5, a management unit 20, according to an embodiment of the present disclosure, is illustrated, where the management unit 20 may include a number updating unit 21, a message updating unit 22, a conversational entry updating unit 23 and a conversational content forming unit 24.

In particular, the number updating unit 21 is used for preserving a correspondence relationship among conversational identification, number and contact name of each conversational message in a time sequence. For example, the number updating unit 21 may store number information as Table 2 shown below:

TABLE 2

The Number Information Table

| No. | Conversational Identification | Number | Contact Name |
|---|---|---|---|
| 1 | 1 | 106591148 | N/A |
| 2 | 3 | 1350000XXXX | Andy |
| 3 | 2 | 10001 | N/A |
| 4 | 3 | 1862880XXXX | Andy |

Herein, the number updating unit 21 may update the preserved correspondence relationship depending on the changes of the numbers of the contacts.

The message updating unit 22 is used for preserving a correspondence relationship among conversational identification, number, detailed content and time of occurrence of each conversational message. For example, the message updating unit 22 may store message information as Table 3 shown below:

TABLE 3

The Message Information Table

| No. | Conversational Identification | Number | Detailed Content | Occurrence Time |
|---|---|---|---|---|
| 1 | 1 | 106591148 | Number Knowledgeable Person reminds you . . . | 2013.4.27 15:54 |
| 2 | 2 | 10001 | 702 | 2013.4.27 16:20 |

TABLE 3-continued

The Message Information Table

| No. | Conversational Identification | Number | Detailed Content | Occurrence Time |
|---|---|---|---|---|
| 3 | 3 | 1350000XXXX | Hi, are you online? | 2013.4.27 16:21 |
| 4 | 2 | 10001 | Dear Guangzhou Samsung Communication . . . | 2013.4.27 16:22 |
| 5 | 3 | 1350000XXXX | Yeah | 2013.4.27 16:23 |
| 6 | 3 | 1862880XXXX | Are you free tonight? | 2013.4.27 16:26 |
| 7 | 3 | 1862880XXXX | Yes | 2013.4.27 16:30 |

Herein, the message updating unit 22 may update the preserved correspondence relationships depending on the changes of the numbers of the contacts.

The conversational entry updating unit 23 is used for preserving a correspondence relationship among conversational identification of each single conversational content and time of occurrence and detailed content of the latest conversational message in the above single conversational content. For example, the conversational entry updating unit 23 may store conversational entry information as Table 4 shown below:

TABLE 4

The Conversational Entry information Table

| Conversational Identification | Occurrence Time | Detailed Contents |
|---|---|---|
| 1 | 2013.4.27 15:54 | Number knowledgeable person reminds you . . . |
| 2 | 2013.4.27 16:22 | Dear Guangzhou Samsung Communication . . . |
| 3 | 2013.4.27 16:30 | Yes |

Herein, the conversational entry updating unit 23 may update the preserved correspondence relationships depending on the changes of the numbers of the contacts.

Furthermore, the conversational content forming unit 24 is used for forming the conversational contents with the contacts based on contact information, the correspondence relationships preserved by the number updating unit 21, the message updating unit 22 and the conversational entry updating unit 23 respectively as well as the contact information stored by the storage unit 10. Herein, the conversational content may include the conversational entry message list and the conversational message list.

Flowcharts depicting how each of updating units of a management unit according to an embodiment of the present disclosure updates conversational information when a number of a contact changes will be described hereinafter with reference to FIGS. 6 to 8.

Figure 6:
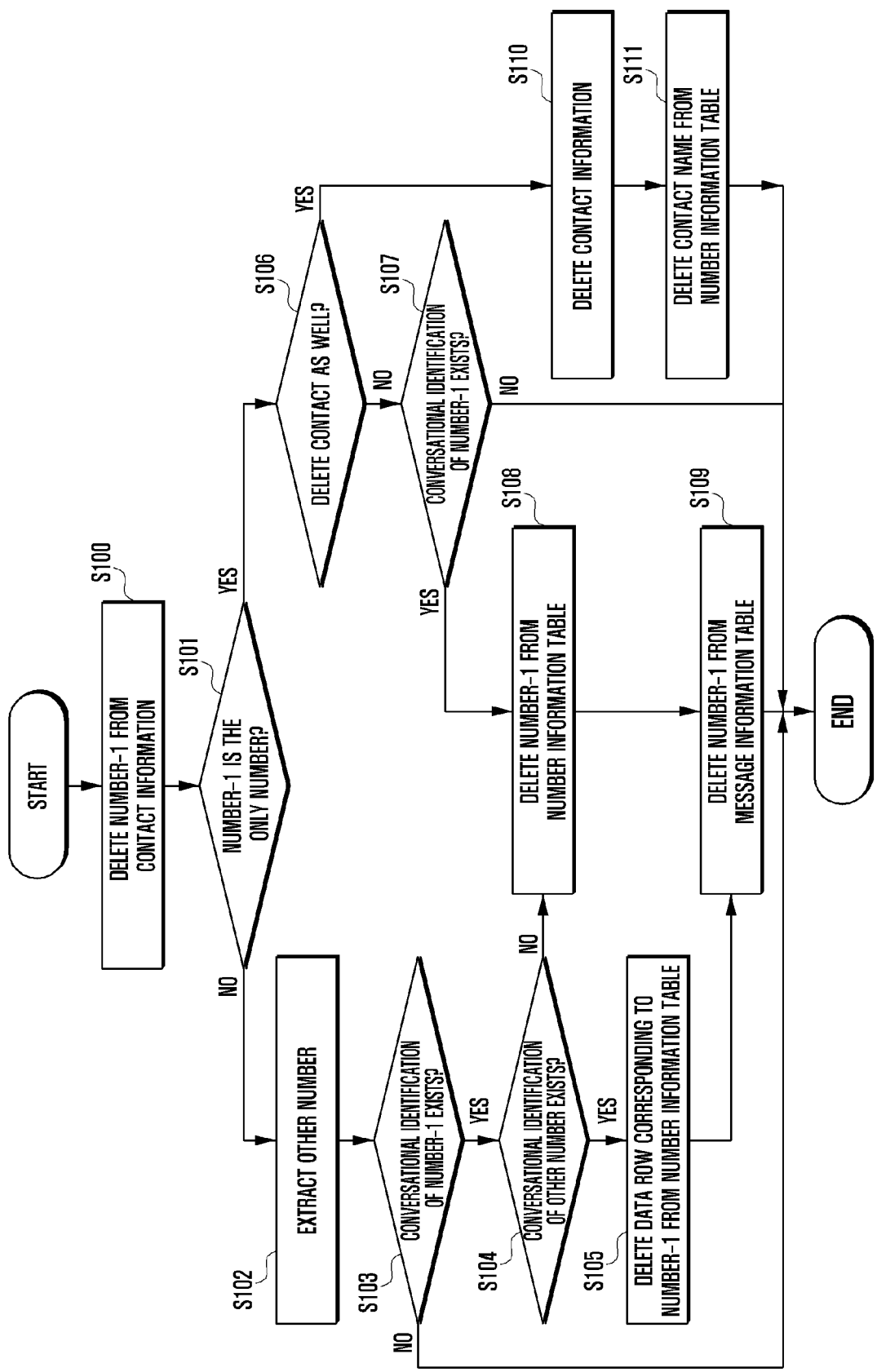
FIG. 6 illustrates a flowchart of a method for updating conversational information when a number is deleted according to an embodiment of the present disclosure.

FIG. 6 illustrates a flowchart of a method for updating conversational information when a number is deleted according to an embodiment of the present disclosure.

Referring to FIG. 6, a flowchart of a method is illustrated, in which a number-1 is deleted from information of a specific contact according to an operation of a user by a storage unit 10 in operation S100.

Thereafter, it is determined by the storage unit 10 whether the specific contact has any other number based on a stored contact information table in operation S101.

If it is determined that the specific contact has other number in operation S101, then the other number of the specific contact is extracted by the storage unit 10 in operation S102.

Thereafter, it is determined by a number updating unit 21 whether a conversational identification corresponding to the number-1 exists based on a stored number information table in operation S103. When it is determined that the conversational identification corresponding to the number-1 does not exist in operation S103, the process as shown in FIG. 6 ends.

If it is determined that the conversational identification corresponding to the number-1 exists in operation S103, then it is further determined by the number updating unit 21 whether conversational identification corresponding to the other number of the specific contact exists in operation S104.

If it is determined that the conversational identification corresponding to the other number of the specific contact does not exist in operation S104, then the number-1 is deleted from the stored number information table by the number updating unit 21 in operation S108, then the number-1 is deleted from the stored message information table by a message updating unit 22 in operation S109.

If it is determined that the conversational identification corresponding to the other number of the specific contact exists in operation S104, then a data row corresponding to the number-1 is deleted from the stored number information table by the number updating unit 21 in operation S105, then the number-1 is deleted from the stored message information table by the message updating unit 22 in operation S109.

Furthermore, if it is determined that the specific contact has no other number in operation S101, then it is determined by the storage unit 10 whether the user wants to delete the specific contact as well in operation 106.

If it is determined that the user wants to delete the specific contact as well in operation 106, then the stored relevant information of the specific contact is deleted by the storage unit 10 in operation S110. Then the name of the specific contact is deleted from the stored number information table by the number updating unit 21 in operation S111.

Moreover, if it is determined that the user does not want to delete the specific contact as well in operation 106, then it is determined by the number updating unit 21 whether a conversational identification corresponding to number-1 exists based on the stored number information table in operation S107. If it is determined that the conversational identification corresponding to the number-1 does not exist in operation S107, then the process as shown in FIG. 6 ends.

If it is determined that the conversational identification corresponding to the number-1 exists in operation S107, then the number-1 is deleted from the stored number information table by the number updating unit 21 in operation S108, then the process proceeds to operation S109 in which the number-1 is deleted from the stored message information table by the message updating unit 22.

Figure 7:
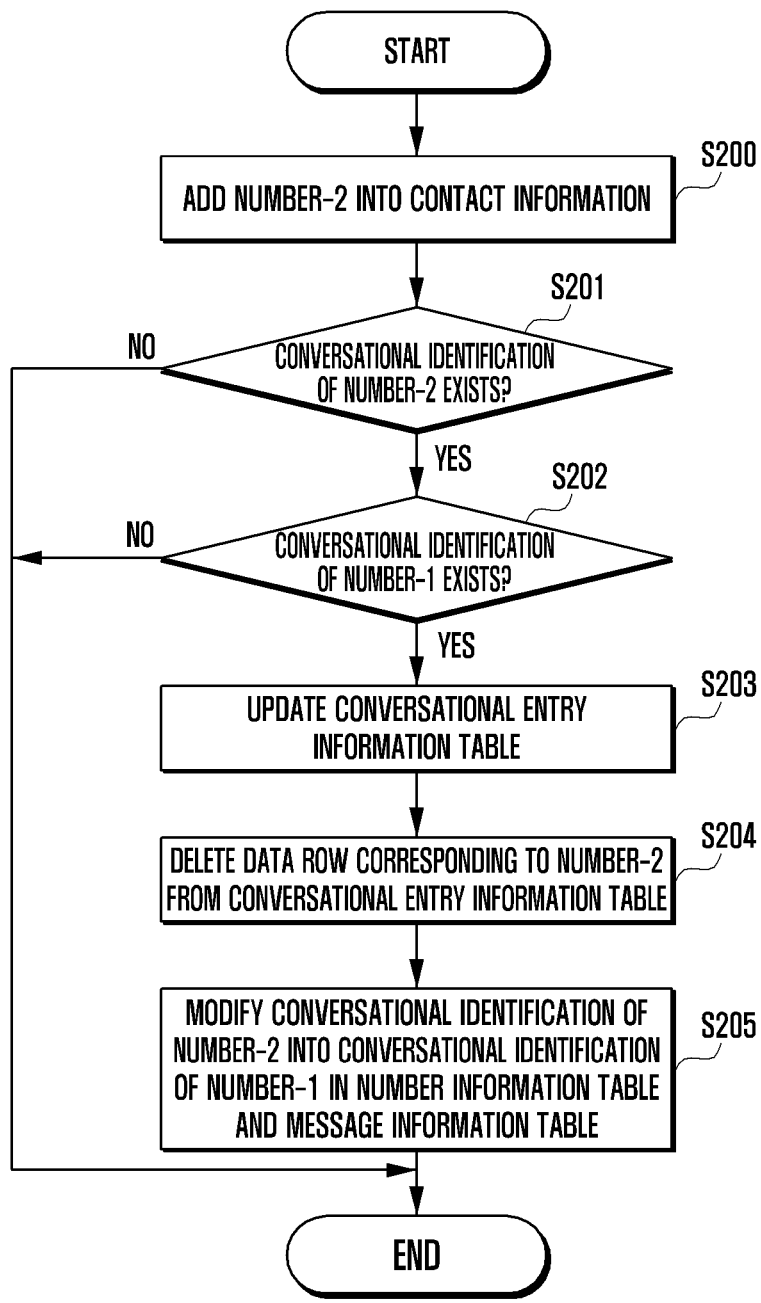
FIG. 7 illustrates a flowchart of a method for updating conversational information when a number is added according to an embodiment of the present disclosure.

FIG. 7 illustrates a flowchart of a method for updating conversational information when a number is added according to an embodiment of the present disclosure.

Referring to FIG. 7, a flowchart of a method for updating conversational information is illustrated, in which a number-2 is added into information of a specific contact which already has a number-1 according to an operation of a user by a storage unit 10 such that the specific contact has both the number-1 and the number-2 in operation S200.

Thereafter, it is determined by a number updating unit 21 whether a conversational identification corresponding to the number-2 exists based on the stored number information table in operation S201. If it is determined that the conversational identification corresponding to the number-2 does not exist in operation S201, then the process as shown in FIG. 7 ends.

If it is determined that the conversational identification corresponding to the number-2 exists in operation S201, then it is determined by the number updating unit 21 whether a conversational identification corresponding to the number-1 exists based on the stored number information table in operation S202. If it is determined that the conversational identification corresponding to the number-1 does not exist in operation S202, then the process as shown in FIG. 7 ends.

If it is determined that the conversational identification corresponding to the number-1 exists in operation S202, then a conversational message closest to a current time among conversational messages with the number-1 and those with the number-2 is used as a latest conversational message of the conversational identification corresponding to the number-1 by a conversational entry updating unit 23 with reference to the message information table stored in the message updating unit 22 in operation S203.

Thereafter, a data row corresponding to the number-2 is deleted from the stored conversational entry information table by the conversational entry updating unit 23 in operation S204. Finally, the conversational identification corresponding to the number-2 in the stored number information table and message information table is modified into the one corresponding to the number-1 by the number updating unit 21 and the message updating unit 22 respectively in operation S205. That is, the conversational content with the number-2 is incorporated into the conversational content with the number-1.

It is to be noted that the flowchart shown in FIG. 7 aims to incorporate the conversational content with the number-2 into the conversational content with the number-1. However, the present disclosure is not limited thereto, which can surely incorporate the conversational content with the number-1 into the conversational content with the number-2.

Figure 8:
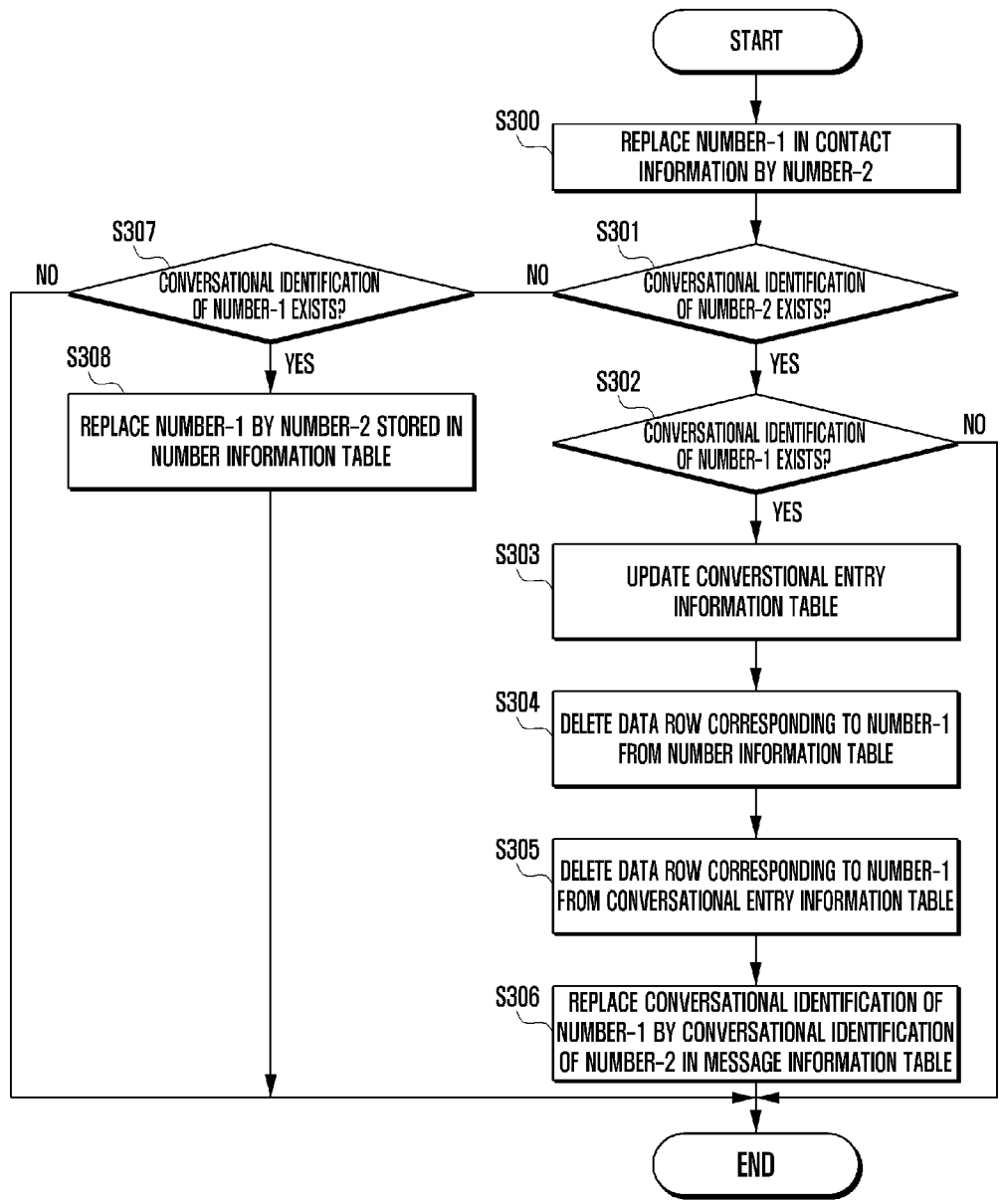
FIG. 8 illustrates a flowchart of a method for updating conversational information when a number is replaced according to an embodiment of the present disclosure.

FIG. 8 illustrates a flowchart of a method for updating conversational information when a number is replaced according to an embodiment of the present disclosure.

Referring to FIG. 8, a flowchart of a method for updating conversational information is illustrated, in which an existing number-1 of a specific contact is replaced by a number-2 by a storage unit 10 according to an operation of a user in operation S300.

Thereafter, it is determined by a number updating unit 21 whether a conversational identification corresponding to the number-2 exists based on a stored number information table in operation S301.

If it is determined that the conversational identification corresponding to the number-2 does not exist in operation S301, then it is further determined by the number updating unit 21 whether a conversational identification corresponding to the number-1 exists in operation S307. If it is determined that the conversational identification corresponding to the number-1 does not exist in operation S307, then the process as shown in FIG. 8 ends. If it is determined that the conversational identification corresponding to the number-1 exists in operation S307, then the number-1 is replaced by the number-2 in the stored number information table by the number updating unit 21 in operation S308.

Furthermore, if it is determined that the conversational identification corresponding to the number-2 exists in operation S301, then it is further determined by the number updating unit 21 whether a conversational identification corresponding to the number-1 exists in operation S302. If it is determined that the conversational identification corresponding to the number-1 does not exist in operation S302, then the process as shown in FIG. 8 ends.

Further, if it is determined that the conversational identification corresponding to the number-1 does exist, as a result of operation S302, then a conversational message closest to a current time among conversational messages with the number-1 and those with the number-2 is used as a latest conversational message of the conversational identification with the number-2 by a conversational entry updating unit 23 with reference to the message information table stored in a message updating unit 22 in operation S303. Thereafter, a data row corresponding to the number-1 is deleted from the stored number information table by the number updating unit 21 in operation S304. Next, a data row corresponding to the number-1 is deleted from the stored conversational entry information table by the conversational entry updating unit 23 in operation S305. Finally, the conversational identification corresponding to the number-1 is replaced by the one corresponding to the number-2 in the stored message information table by the message updating unit 22.

Examples explaining how each of the updating units of the management unit 20 operates under different conditions have been described as above. Flowcharts for providing message contents according to various embodiments of the present disclosure will be described hereinafter with reference to FIGS. 9 to 11.

Figure 9:
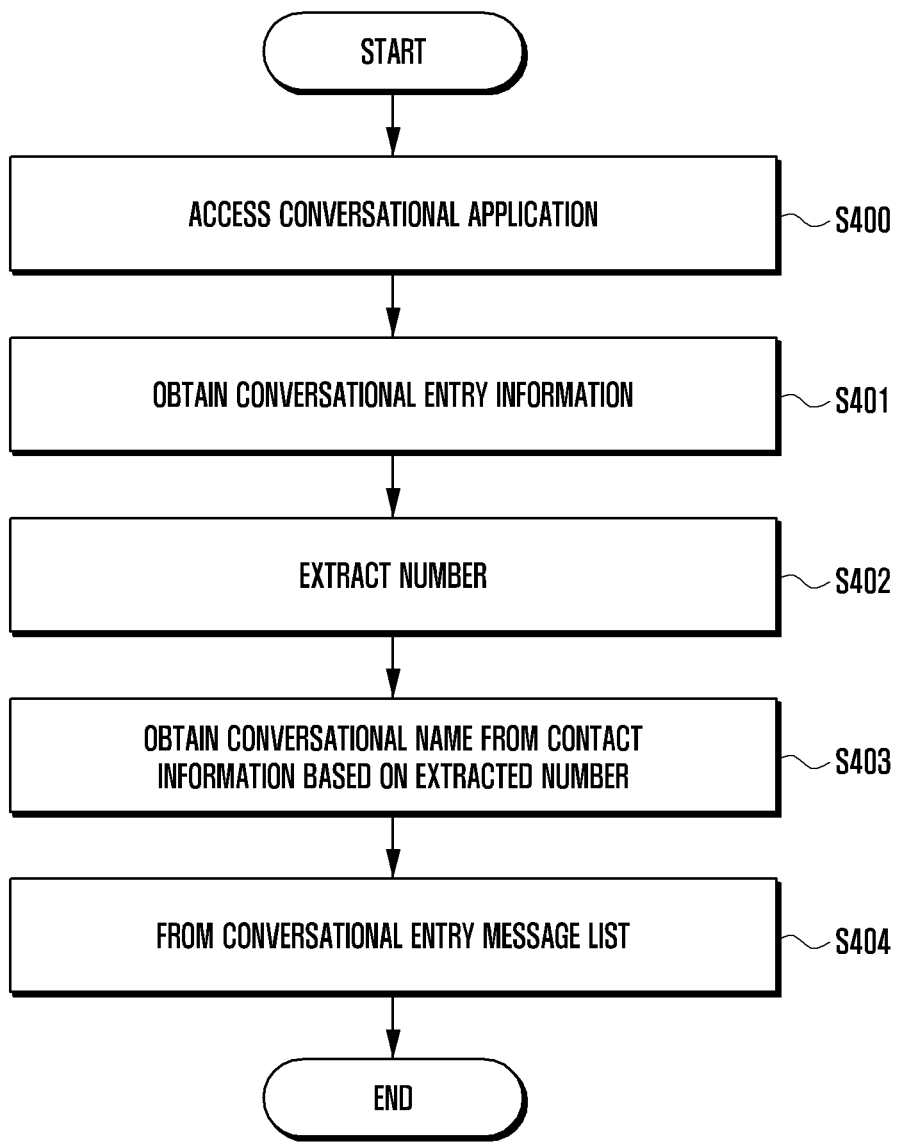
FIG. 9 illustrates a flowchart of a method for forming a conversational entry message list according to an embodiment of the present disclosure.

FIG. 9 illustrates a flowchart of a method for forming a conversational entry message list according to an embodiment of the present disclosure.

Referring to FIG. 9, a flowchart of a method for forming a conversational entry message is illustrated, in which a conversational application is accessed according to an operation of a user in operation S400. In this case, a conversational entry information table is obtained by a conversational content forming unit 24 from a conversational entry updating unit 23 such that conversational identification, message content and time of occurrence of respective conversational entry messages are acquired in operation S401.

Thereafter, a number corresponding to a latest conversational message corresponding to the conversational identification is extracted from the number information table in a number updating unit 21 by the conversational content forming unit 24 based on the obtained conversational identification in operation S402.

Next, the name (or other corresponding personal information, such as profile photo) of the contact to which the number belongs is obtained, by the conversational content forming unit 24, from the contact information table in a storage unit 10 based on the extracted number in operation S403.

Thereafter, a conversational entry message list related to various conversations is formed by the conversational content forming unit 24 based on the name of the contact (together with profile photos), number, message content and time of occurrence obtained as described above in operation S404. Herein, each of entry messages of the conversational entry message list may correspond to one conversational identification.

The method for forming the conversational entry message list after the messaging application is accessed has been described as above with reference to FIG. 9. After the entry messages of various conversations are displayed for a user, the user may choose to access various incoming and outgoing message (i.e., conversational message list) of a specific conversation from the entry of the specific conversation.

Figure 10:
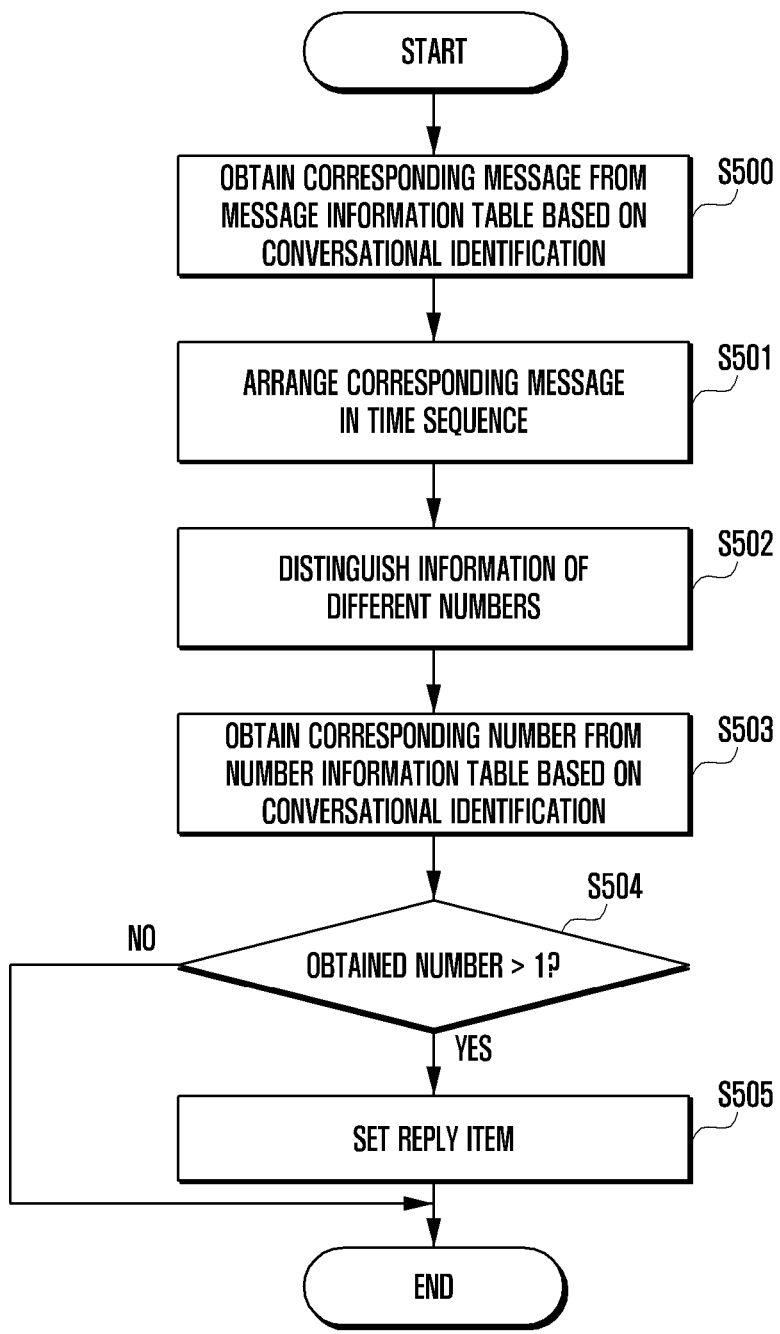
FIG. 10 illustrates a flowchart of a method for forming a conversational message list according to an embodiment of the present disclosure.

FIG. 10 illustrates a flowchart of a method for forming a conversational message list according to an embodiment of the present disclosure.

Referring to FIG. 10, a flowchart of a method for forming a conversational message list is illustrated, in which, when a user chooses to access a certain conversation, conversational message items corresponding to a conversational identification are obtained by a conversational content forming unit 24 from a message information table in a message updating unit 22 based on a corresponding conversational identification in operation S500. Herein, the conversational message items may include corresponding numbers, detailed message contents and times of occurrence.

Next, the obtained various conversational message items are arranged in an order of a time of occurrence (e.g., time sequence) by the conversational content forming unit 24 in operation S501.

Messages from different numbers among the various conversational message items are distinguished by the conversational content forming unit 24 such that a display unit 30 may display the conversational message items associated with various numbers distinctively based on a result of distinguishing in operation S502. For example, the display unit 30 may distinguish between the conversational message items associated with different numbers by using different background colors, background patterns or relevant icons.

All of the numbers corresponding to the conversational identification are obtained from the number information table in a number updating unit 21 based on the conversational identification by the conversational content forming unit 24 in operation S503. Thereafter, it is determined by the conversational content forming unit 24 whether the quantity of the obtained numbers is greater than 1 in operation S504.

If the quantity of the obtained numbers is not greater than 1 in operation S504, then the process as shown in FIG. 10 ends. That is, the various conversational message items obtained in operation S502 may be used as the finally formed conversational message list.

When the quantity of the obtained numbers is greater than 1 in operation S504, then it is further needed to set a reply item. In particular, the reply item for the reply message is set by the conversational content forming unit 24 among the numbers obtained in operation S503 in operation S505. For example, the conversational content forming unit 24 may display check boxes nearby the obtained numbers such that the corresponding number is used as the reply number when its box is checked. Herein, the reply number is a number to which the reply message for the contact is to be sent. As another example, the conversational content forming unit 24 may set a number corresponding to the last message among the obtained numbers as the reply number.

The method for forming the conversational message list after the user selects a specific conversation has been described above with reference to FIG. 10. Furthermore, the conversational information may be updated according to the method shown in FIG. 11 when a new conversational message is received.

Figure 11:
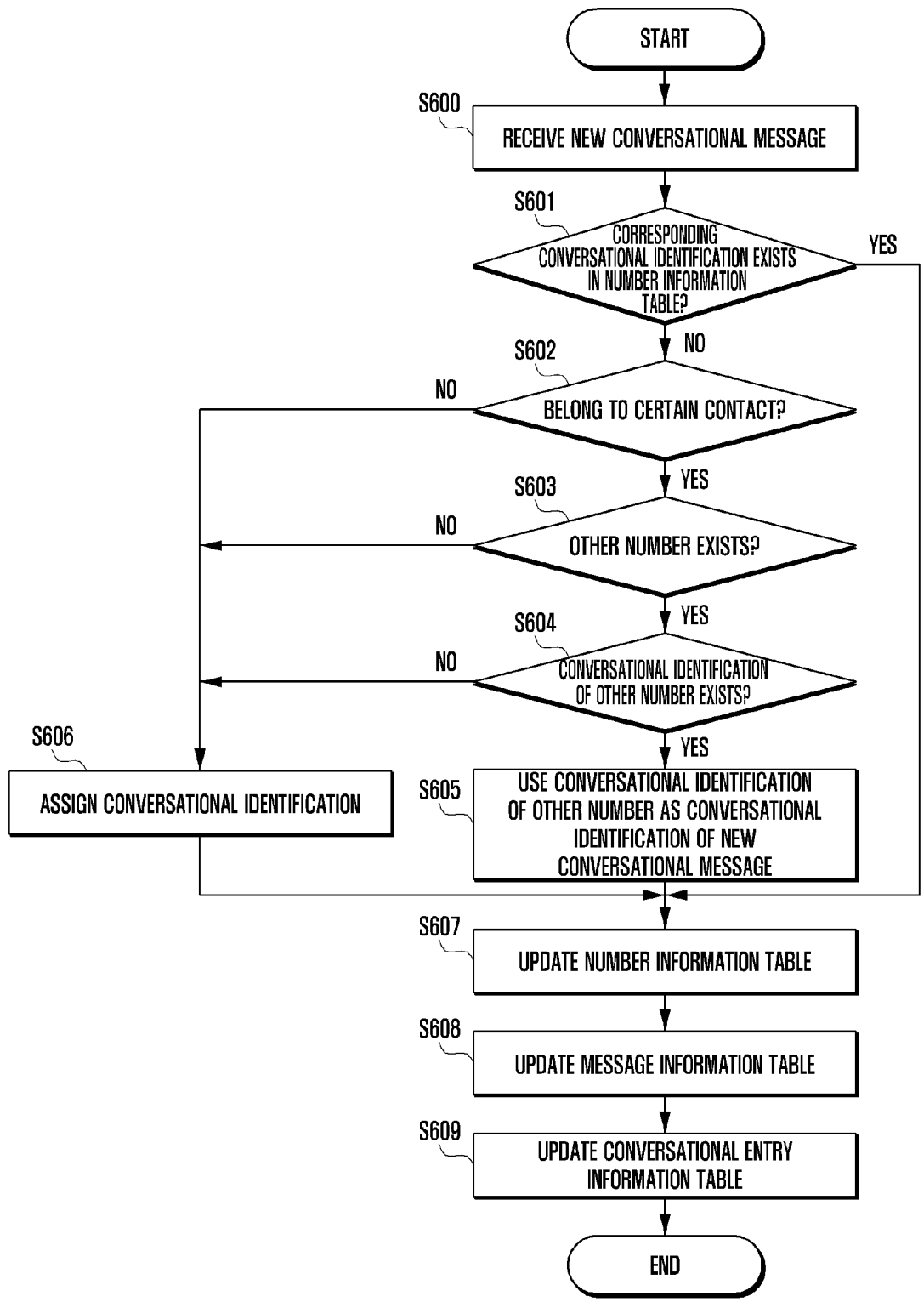
FIG. 11 illustrates a flowchart of a method for updating conversational information when a new conversational message is received according to an embodiment of the present disclosure.

FIG. 11 illustrates a flowchart of a method for updating conversational information when a new conversational message is received according to an embodiment of the present disclosure.

Referring to FIG. 11, a flowchart of a method for updating conversational information is illustrated, in which a new conversational message is received by a terminal in operation S600.

Thereafter, it is determined by a number updating unit 21 whether a conversational identification corresponding to a number of the new conversational message exists based on the stored number information table in operation S601.

If it is determined that the conversational identification corresponding to the number of the new conversational message exists in operation S601, then the stored number information table is updated by the number updating unit 21 with the conversational identification as well as a number of the received conversational message and a name of the corresponding contact in operation S607. Next, the stored message information table is updated by a message updating unit 22 with the conversational identification as well as the number, detailed content and time of occurrence of the received conversational message in operation S608. Thereafter, the stored conversational entry information table is updated by a conversational entry updating unit 23 with the conversational identification as well as the time of occurrence and detailed content of the received conversational message in operation S609.

Furthermore, if it is determined that the conversational identification corresponding to the number of the new conversational message does not exist in operation S601, then it is determined by a storage unit 10 whether the number of the new conversational message belongs to a certain contact based on the stored contact information in operation S602.

If it is determined that the number of the new conversation does not belong to any contact in operation S602, then a conversational identification is assigned to the new conversational message by a conversational content forming unit 24 in operation S606. Next, the stored number information table is updated by the number updating unit 21 with the assigned conversational identification as well as the number of the received conversational message and the corresponding contact in operation S607. Next, the stored message information table is updated by a message updating unit 22 with the conversational identification as well as the number, detailed content and time of occurrence of the received conversational message in operation S608. Thereafter, the conversational entry information table is updated by the conversational entry updating unit 23 with the assigned conversational identification as well as the time of occurrence and the detailed content of the received conversational message in operation S609.

If it is determined that the number of the new conversation belongs to a certain contact in operation S602, then it is further determined by the storage unit 10 whether the certain contact has any other number in operation S603. If it is determined that the certain contact has no other number in operation S603, then a conversational identification is assigned to the new conversational message by the conversational content forming unit 24 in operation S606. Thereafter, the stored number information table is updated by the number updating unit 21 with the assigned conversational identification as well as the number of the received conversational message and the name of the corresponding contact in operation S607. Next, the stored message information table is updated by the message updating unit 22 with the assigned conversational identification as well as the number, detailed content and time of occurrence of the received conversational message in operation S608. Thereafter, the stored conversational entry information table is updated by the conversational entry updating unit 23 with the assigned conversational identification as well as the time of occurrence and detailed content of the received conversational message in operation S609.

If it is determined that the certain contact has some other number in operation S603, then it is determined by the number updating unit 21 whether a conversational identification corresponding to the other number exists based on the stored number information table in operation 604. If it is determined that the conversational identification corresponding to the other number does not exist in operation S604, then a conversational identification is assigned to the new conversational message by the conversational content forming unit 24 in operation S606. Thereafter, the stored number information table is updated by the number updating unit 21 with the assigned conversational identification as well as the number of the received conversational message and the name of the corresponding contact in operation S607. Next, the stored message information table is updated by the message updating unit 22 with the assigned conversational identification as well as the number, detailed content and time of occurrence of the received conversational message in operation S608. Thereafter, the stored conversational entry information table is updated by the conversational entry updating unit 23 with the assigned conversational identification as well as the time of occurrence and detailed content of the received conversational message in operation S609.

If it is determined that the conversational identification corresponding to the other number exists in operation S604, then the conversational identification corresponding to the other number is used as the conversational identification of the new conversational message by the number updating unit 21 in operation S605. Thereafter, the stored number information table is updated by the number updating unit 21 with the conversational identification as well as the number of the received conversational message and the name of the corresponding contact in operation S607. Next, the stored message information table is updated by the message updating unit 22 with the conversational identification as well as the number, detailed content and time of occurrence of the received conversational message in operation S608. Thereafter, the stored conversational entry information table is updated by the conversational entry updating unit 23 with the conversational identification as well as the time of occurrence and detailed content of the received conversational message in operation S609.

Examples of processing the conversational information to provide the conversational content according to various embodiments of the present disclosure have been described above with reference to FIGS. 6 to 11. It can be seen from the examples that by processing the conversational information, messages before the number of the contact changes may be displayed to be associated with the contact all the same, and the incoming and outgoing messages after the number changes may be displayed in accordance with the changed correspondence relationship of the contacts.

With respect to the certain manner described above for managing conversations with contacts, a conversational content managing apparatus for implementing good interactive mode may further be provided according to an embodiment of the present disclosure.

Figure 12:
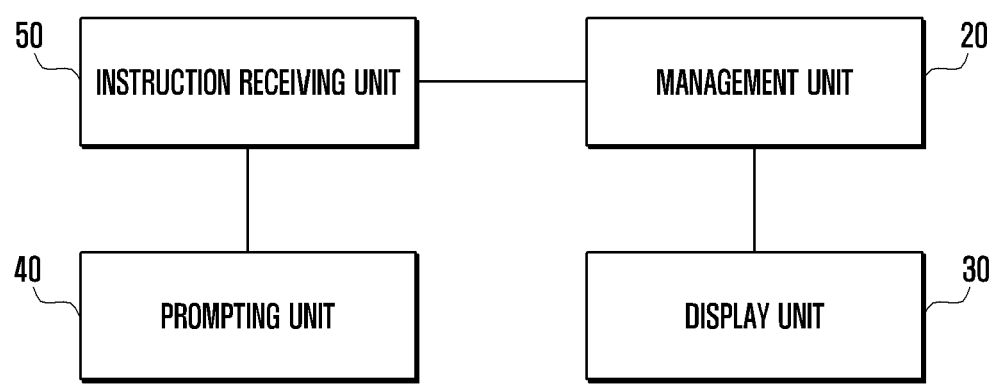
FIG. 12 illustrates a block diagram of an apparatus for managing conversational content with a contact in a terminal according to an embodiment of the present disclosure.

FIG. 12 illustrates a block diagram of an apparatus for managing conversational content with a contact in a terminal according to an embodiment of the present disclosure.

Referring to FIG. 12, a conversational content managing apparatus according to an embodiment of the present disclosure is illustrated, in which the conversational content managing apparatus includes a management unit 20, a display unit 30, a prompting unit 40 and an instruction receiving unit 50. Herein, through the processes of both the prompting unit 40 and the instruction receiving unit 50, different contact conversation managing manners may be performed by the management unit 20 according to a user's intentions.

In particular, the prompting unit 40 is used for generating an incorporation prompting message in a case that a number of a contact is deleted or replaced, and output the generated incorporation prompting message. Herein, the incorporation prompting message may be used for prompting the user about whether or not to incorporate conversation messages with the number before the number is deleted or replaced into a conversational content with the contact.

The instruction receiving unit 50 is used for receiving an incorporating instruction for performing an incorporation after the incorporation prompting message is outputted by the prompting unit 40.

For example, the incorporation prompting message described herein may include options of "OK" and "Cancel", and the incorporating instruction refers to a selection of the option of "OK" by the user.

The management unit 20 is used for processing the conversational information associated with the number before the number is deleted or replaced in a case that an incorporating instruction is received by the instruction receiving unit 50 such that the conversational message with the number before the number is deleted or replaced is included in the conversational content with the contact. Herein, the management 20 operates in a similar way as the management 20 as shown in FIG. 2, except that the incorporating process is needed to be executed in the condition that the incorporating instruction is received.

The display unit 30 is used for displaying the conversational content with the contact formed by the management unit 20. Preferably, while displaying the conversational content with the contact, if a conversational message with the number before the number is deleted or replaced is included in the conversational content, then the display unit 30 may distinguish the conversational message from other conversational messages in the conversational content. For example, the display unit 30 may distinctively display the conversational message with the number before the number is deleted or replaced by means of highlighting such as lighting and coloring or adding illustrative text.

Preferably, the prompting unit 40 may generate and output the incorporation prompting message immediately when the number of the contact is deleted or replaced. In this case, the incorporation of the relevant messages may be finished while the number is changed.

Otherwise, after the number of the contact is deleted or replaced, the prompting unit 40 may output the generated incorporation prompting message when a conversational content with at least one of the contact whose number is deleted or replaced, the deleted or replaced number and a new contact to which the deleted or replaced number belongs is displayed by the display unit 30. In this case, the user may be prompted about whether or not to perform the incorporation while the conversational content of the relevant contact or number is displayed after the number is changed. If the user chooses to perform incorporation, then the management unit 20 performs the corresponding incorporating process. If the user refuses to perform incorporation, then the management unit 20 excludes the conversational messages with the number before the number is deleted or replaced from the conversational content with the contact, and the prompting unit 40 no longer outputs the incorporation prompting message. If the user ignores the incorporation prompting message by performing no operation, then the prompting unit 40 may output the incorporation prompting message one more time in order to request the user to make a choice when the relevant conversational content is displayed again by the display unit 20.

In addition to the incorporation prompting message for requesting the user to make a choice about whether or not to perform the incorporation, the prompting unit 40 may further generate the notification message for informing the user that the number is deleted from the contact or is replaced, and output the generated notification message when at least one of the contact whose number is deleted or replaced, the deleted or replaced number and the new contact to which the deleted or replaced number belongs is displayed by the display unit 30. For example, the prompting unit 40 may selectively output the incorporation prompting message with respect to some certain conversational contents, and output the notification message described above with respect to some other conversational contents.

For example, the incorporation prompting message or notification message may be embedded in the conversational content or placed in a separate window. Preferably, the incorporation prompting message or notification message may be embedded at the top or bottom of the conversational content or the position of a conversational message closest to the time when the number is deleted or replaced in the conversational content. The separate window described herein may be a pop-up window or a parallel watch window.

Preferably, the prompting unit 40 may output an entry for linking to the conversational message with the deleted or replaced number or an entry for linking to the conversational message with the contact whose number is deleted or replaced together with the incorporation prompting message or notification message. In this manner, the user can easily check contents of the relevant conversational messages before making a choice about whether or not to perform the incorporation.

For example, in a case that the incorporating instruction is not received by the instruction receiving unit 50, if the deleted or replaced number belongs to a new contact, then the display unit 30 may distinguish the conversational messages with the number before the number is deleted or replaced from the other conversational messages in a conversational content while displaying the conversational content with the new contact.

Figure 13:
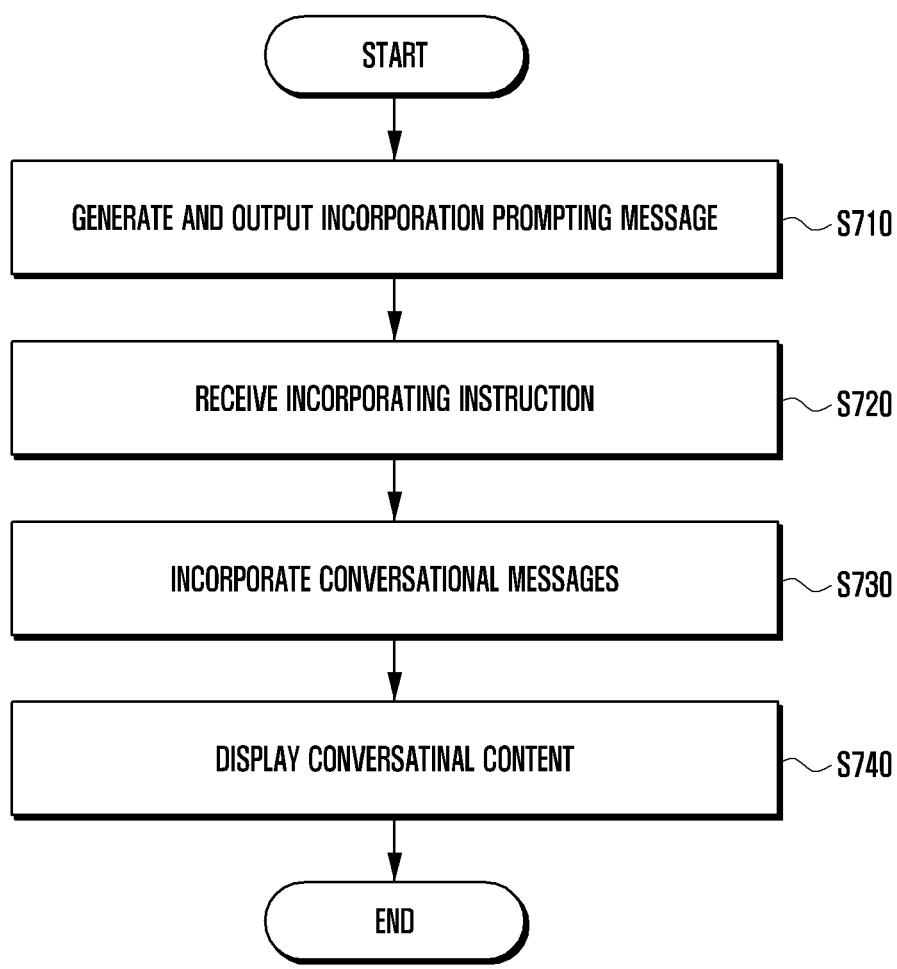
FIG. 13 illustrates a flowchart of a method for managing conversational content with a contact in a terminal according to an embodiment of the present disclosure.

FIG. 13 illustrates a flowchart of a method for managing a conversational content with a contact in a terminal according to an embodiment of the present disclosure.

Referring to FIG. 13, a flowchart of a method for managing a conversational content is illustrated, in which an incorporation prompting message is generated and outputted by a prompting unit 40 in a case that a number of a contact is deleted or replaced in operation S710. Herein, the incorporation prompting messages is used for prompting the user about whether or not to incorporate conversation messages with the number before the number is deleted or replaced into the conversational content of the contact.

An incorporating instruction for performing an incorporation is received by an instruction receiving unit 50 after the incorporation prompting message is outputted by the prompting unit 40 in operation S720.

For example, the incorporation prompting message described herein may include options of "OK" and "Cancel", and the incorporating instruction refers to a selection of the option of "OK" by the user.

In a case that an incorporating instruction is received by the instruction receiving unit 50, the conversational information associated with the number before the number is deleted or replaced is processed by a management unit 20, such that the conversational message with the number before the number is deleted or replaced is included in the conversational content with the contact in operation S730. Herein, operation S730 is similar to operation S30 as shown in FIG. 3, except that the incorporating process is needed to be executed in the condition that the incorporating instruction is received.

The conversational content with the contact formed by the management unit 20 is displayed by a display unit 30 in operation S740. Preferably, while displaying the conversational content with the contact, if a conversational message with the number before the number is deleted or replaced is included in the conversational content, then the display unit 30 may distinguish the conversational message from other conversational messages in the conversational content while. For example, the display unit 30 may distinctively display the conversational message with the number before the number is deleted or replaced by means of highlighting such as lighting and coloring or adding illustrative text.

It should be understood by those skilled in the art that the steps described above may be performed in a time sequence, or the order of the respective steps or operations therein may be adjusted, or some of the steps may be performed at the same time.

For example, preferably, the prompting unit 40 may generate and output the incorporation prompting message immediately when the number of the contact is deleted or replaced. In this case, the incorporation of the relevant messages may be finished while the number is changed. Otherwise, after the number of the contact is deleted or replaced, the prompting unit 40 may output the generated incorporation prompting message when a conversational content with at least one of the contact whose number is deleted or replaced, the deleted or replaced number and a new contact to which the deleted or replaced number belongs is displayed by the display unit 30. In this case, the user may be prompted about whether or not to perform the incorporation while the conversational content of the relevant contact or number is displayed after the number is changed. If the user chooses to perform incorporation, then the management unit 20 may perform the corresponding incorporating process. If the user refuses to perform incorporation, then the management unit 20 excludes the conversational messages with the number before the number is deleted or replaced from the conversational content with the contact, and the prompting unit 40 no longer outputs the incorporation prompting message. If the user ignores the incorporation prompting message by performing no operation, then the prompting unit 40 may output the incorporation prompting message one more time in order to request the user to make a choice when the relevant conversational content is displayed again by the display unit 20.

In addition to the incorporation prompting message for requesting the user to make a choice about whether or not to perform the incorporation, the method may further include by prompting unit 40, generating the notification message for informing the user that the number is deleted from the contact or is replaced, and outputting the generated the notification message when at least one of the contact whose number is deleted or replaced, the deleted or replaced number and the new contact to which the deleted or replaced number belongs is displayed by the display unit 30. For example, the prompting unit 40 may selectively output the incorporation prompting message with respect to some certain conversational contents, and output the notification message described above with respect to some other conversational contents.

For example, the incorporation prompting message or notification message may be embedded in the conversational content or placed in a separate window. Preferably, the incorporation prompting message or notification message may be embedded at the top or bottom of the conversational content or the position of a conversational message closest to the time when the number is deleted or replaced in the conversational content. The separate window described herein may be a pop-up window or a parallel watch window.

Preferably, in the process of outputting the incorporation prompting message or notification message by the prompting unit 40, an entry for linking to the conversational message with the deleted or replaced number or an entry for linking to the conversational message with the contact whose number is deleted or replaced may be outputted as well. In this manner, the user can easily check contents of the relevant conversational messages before making a choice about whether or not to perform the incorporation.

FIGS. 14A to 14E illustrate interfaces for managing conversational contents with a contact in a terminal according to various embodiments of the present disclosure.

In the example as shown in FIGS. 14A to 14E, it is assumed that number 010-1111-1111 of contact Chris is deleted and a new number of Chris is 010-2222-2222.

Figure 14A:
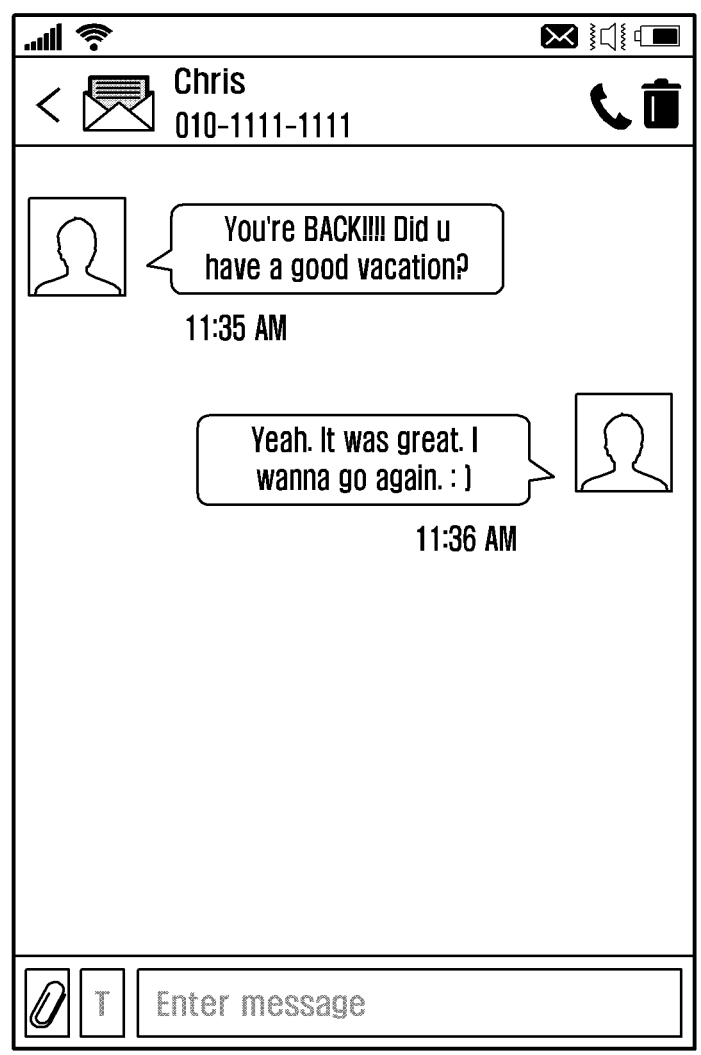
FIGS. 14A, 14B, 14C, 14D, and 14E illustrate interfaces for managing conversational content with a contact in a terminal according to various embodiments of the present disclosure.

Referring to FIG. 14A, an interface is illustrated, in which, when the number 010-1111-1111 belongs to contact Chris, there are two relevant conversational messages, "You're BACK!!!! Did u have a good vacation?" at 11:35 AM and "Yeah. It was great. I wanna go again. :)" at 11:36 AM.

Figure 14B:
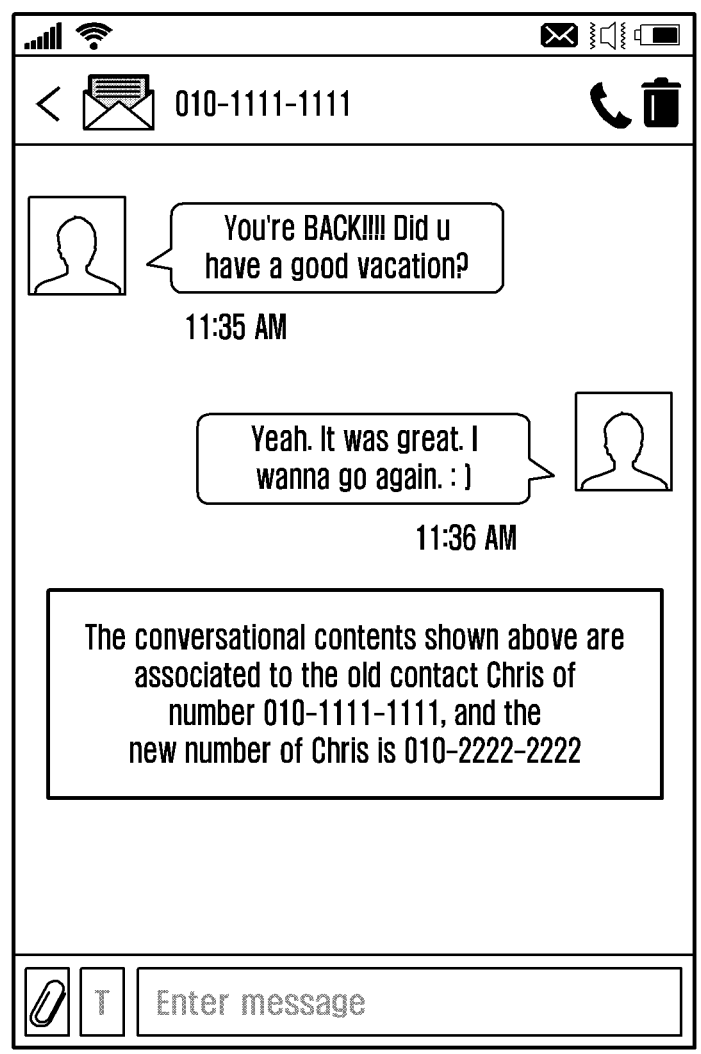

Referring to FIG. 14B, an interface is illustrated in which, when the number 010-1111-1111 is deleted from contact Chris, the relevant conversational content associated with the number 010-1111-1111 is displayed along with the number 010-1111-1111, which has nothing to do with Chris. In this case, a prompting unit 40 may generate a notification message for informing the user that the number 010-1111-1111 is deleted from contact Chris, for example, "The conversational contents shown above are associated with the old contact Chris of number 010-1111-1111, and the new number of Chris is 010-2222-2222", and display the notification message at a particular location (for example, at the bottom) in the conversational content with number 010-1111-1111 as shown in FIG. 14B.

Figure 14C:
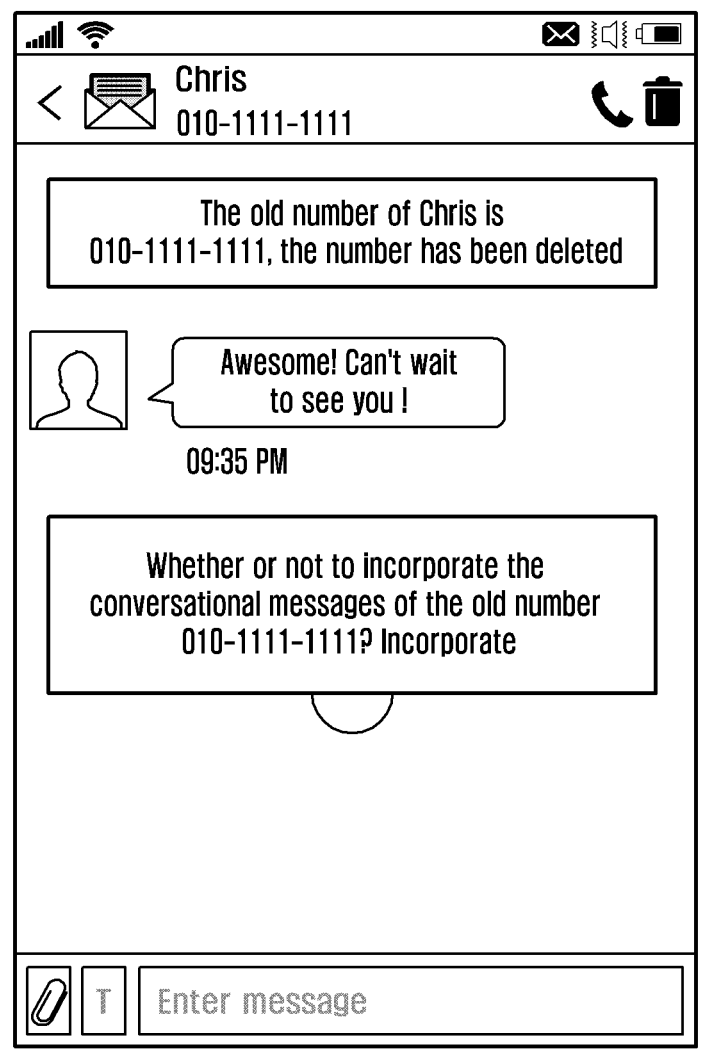

Referring to FIG. 14C, an interface is illustrated in which, when the conversational content with contact Chris owning the new number 010-2222-2222 (which includes "Awesome! Can't wait to see you!" at 9:35 PM) is displayed, then a prompting unit 40 may generate and output a notification message for informing the user that the number 010-1111-1111 is deleted from contact Chris, for example, "The old number of Chris is 010-1111-1111, the number has been deleted". Besides, the prompting unit 40 may further generate an incorporation prompting message, for example, "Whether or not to incorporate the conversational messages of the old number 010-1111-1111?". Preferably, an incorporating link "Incorporate" may be showed by the side of the message.

Figure 14D:
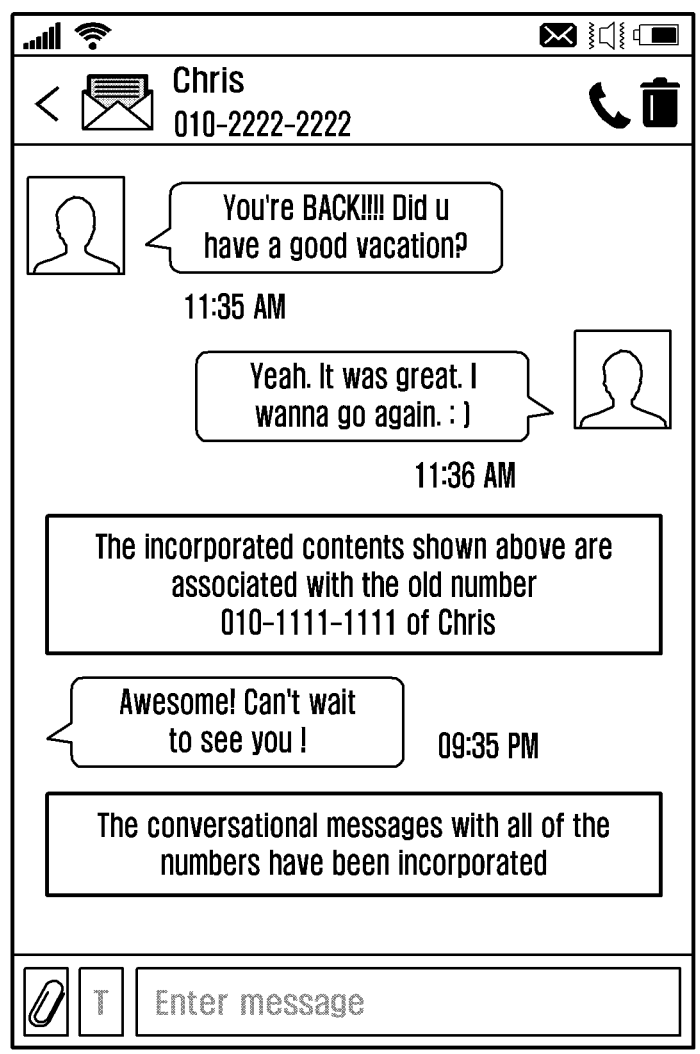

Referring to FIG. 14D, an interface is illustrated in which, when the link "Incorporate" is clicked by the user, the conversational messages with the number 010-1111-1111 before the number is deleted may be included in the conversational content with contact Chris by a management unit 20. Furthermore, the prompting unit 40 may generate and output a relevant notification message, for example, "The incorporated contents shown above are associated with the old number 010-1111-1111 of Chris" and "The conversational messages with all of the numbers have been incorporated".

Figure 14E:
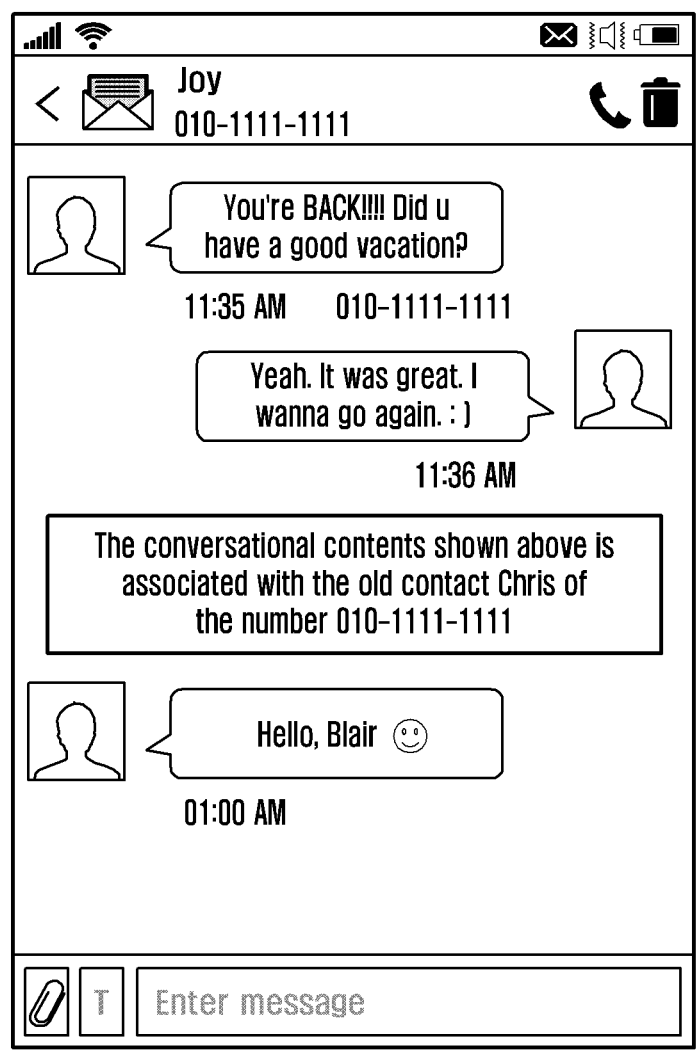

Referring to FIG. 14E, an interface is illustrated in which, the deleted number 010-1111-1111 may further become a new number of another contact Joy. In this case, if the previous conversational messages with the number 010-1111-1111 are not chosen to be incorporated into the conversational content with contact Chris in a case of that illustrated in FIG. 14C, then the conversational messages with the number 010-1111-1111 will be displayed in the conversational content with contact Joy. Accordingly, the prompting unit 40 may generate and output a notification message regarding the contact changing of the number, for example, "The conversational content shown above is associated with the old contact Chris of the number 010-1111-1111". A conversational message of "Hello, Blair" with contact Joy owning the number 010-1111-1111 may be displayed under the notification message described above.

Figure 15A:
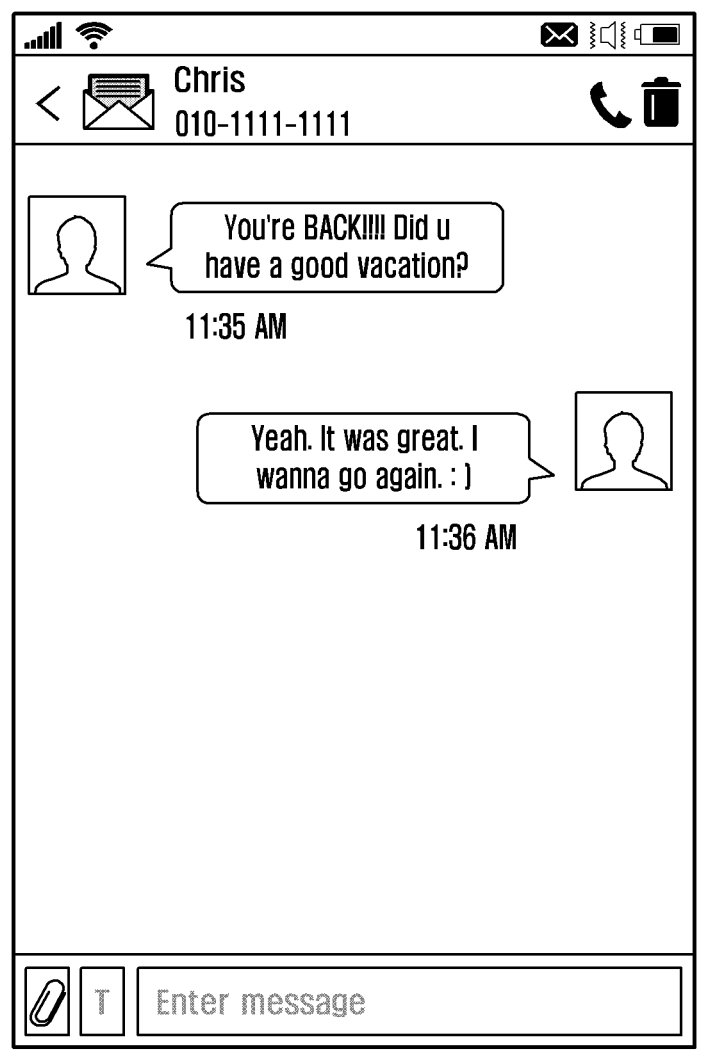
FIGS. 15A, 15B, and 15C illustrate interfaces for managing conversational content with a contact in a terminal according to various embodiments of the present disclosure.
Figure 15B:
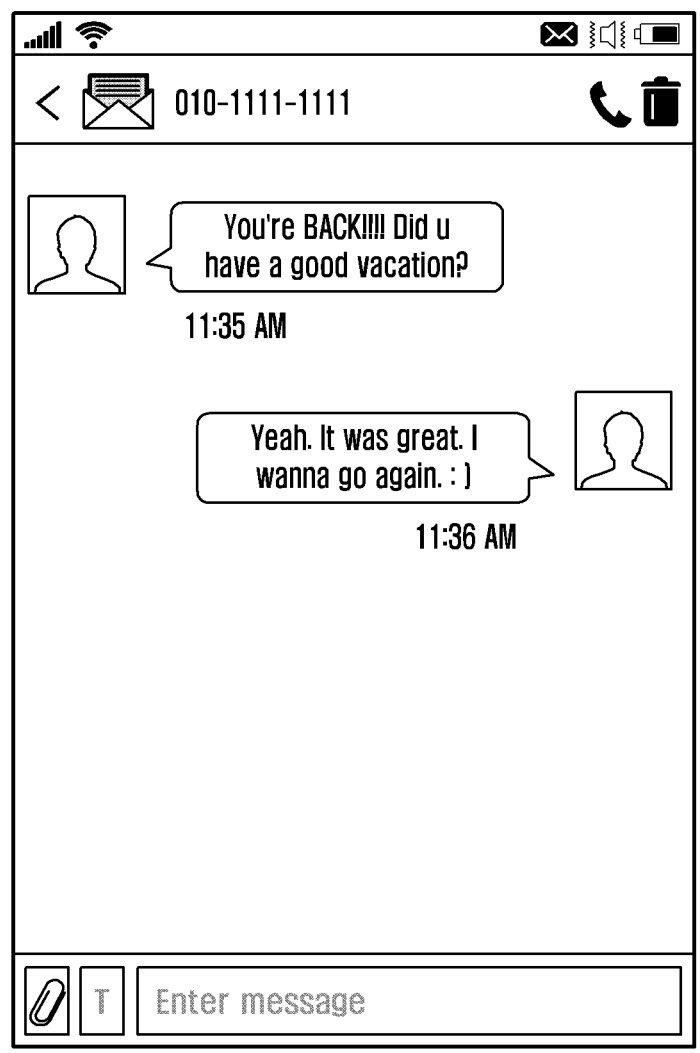
Figure 15C:
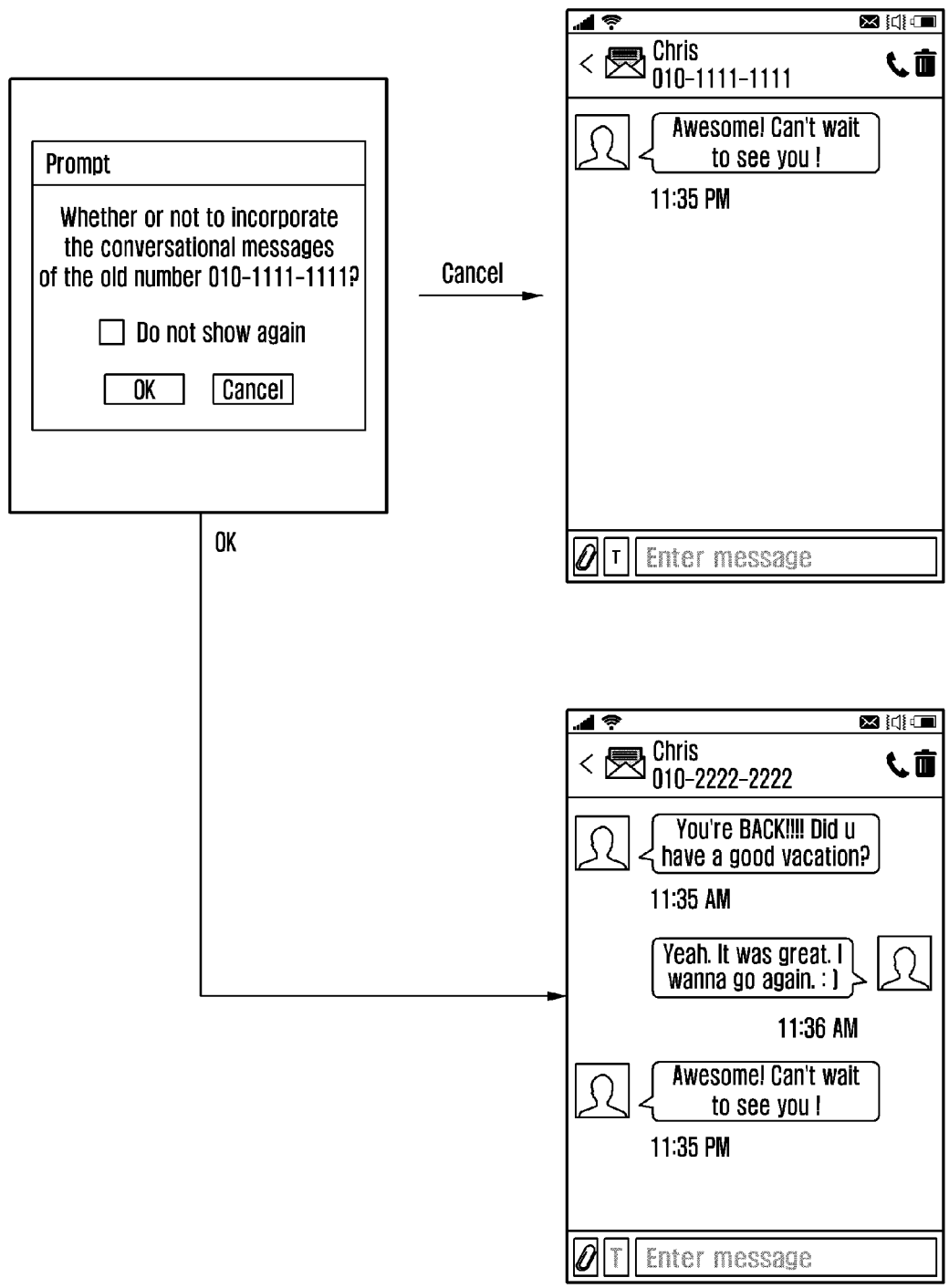

FIGS. 15A to 15C illustrate interfaces for managing a conversational content with a contact in a terminal, according to various embodiments of the present disclosure.

In the present example, it is assumed that a number 010-1111-1111 of contact Chris is deleted and a new number of Chris is 010-2222-2222.

Referring to FIG. 15A, an interface for managing a conversational content is illustrated, in which, when a number 010-1111-1111 belongs to contact Chris, there are two relevant conversational messages, "You're BACK! ! ! ! Did u have a good vacation?" at 11:35 AM and "Yeah. I was great. It wanna go again. :)" at 11:36 AM.

Referring to FIG. 15B, an interface managing a conversational content is illustrated, in which, when a number 010-1111-1111 is deleted from contact Chris, a relevant conversational content with the number 010-1111-1111 is displayed along with number 010-1111-1111, which has nothing to do with Chris.

Referring to FIG. 15C, various interfaces managing a conversational content are illustrated, in which, a prompting unit 40 may output the generated incorporation prompting message of "Prompt: whether or not to incorporate the conversational messages of the old number 010-1111-1111?" along with options of "OK" and "Cancel" in the form of a pop-up window when a conversational content interface with contact Chris owning the new number 010-2222-2222 is accessed. In a case that the option of "OK" is selected, the conversational messages with number 010-1111-1111 before the number is deleted may be included in the conversational content with contact Chris by a management unit 20. In a case that the option of "Cancel" is selected, the process described above may be omitted.

It should be understood that the examples described above are not used for limiting the scope of the present disclosure. According to the various embodiments of the present disclosure, the relevant incorporation prompting messages or notification messages may be generated and outputted in various ways different from the examples described above, and the conversational content interfaces with various contacts or numbers may be outputted in variety of appropriate ways.

In the conversational content managing apparatus and method according to the various embodiments of the present disclosure, contact information and conversational information with contacts are stored separately and the corresponding processes are performed based on these information. Therefore, the conversational messages with the number before the number is deleted will still be included in the conversational content with the contact. In this case, when a number of a contact changes, conversational content with the number before the number changes may still be displayed with respect to the contact, such that the user of the terminal may efficiently find out the previous conversational content with the contact.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for managing conversational content associated with a contact in a terminal, the apparatus comprising:
   a storage unit configured to store contact information including a name of each of contacts and a corresponding number;
   a management unit configured to:
      preserve conversational information associated with one of the contacts, which includes the corresponding number of the one contact, the one contact, a time of occurrence and a detailed content associated with each of conversational messages, and
      form a conversational content with the one contact to be displayed for a user based on the contact information and the conversational information; and
   a display unit configured to display the conversational content with the one contact formed by the management unit for the user,
   wherein the management unit is further configured to incorporate the conversational message associated with the corresponding number of the one contact, before the corresponding number of the one contact is deleted from or replaced in the contact information, into the conversational content associated with the one contact by processing the conversational information associated with the corresponding number of the one contact before the corresponding number is deleted from or replaced in the contact information, such that the conversational message associated with the corresponding number of the one contact is included in the conversational content when the corresponding number of the one contact is deleted or replaced.

2. The apparatus of claim 1, wherein, when an old number of the one contact is replaced by a new number, the management unit is further configured to incorporate the conversational message associated with the old number before the old number is replaced and all conversational messages associated with the new number into the conversational content associated with the one contact by processing the conversational information associated with the old number before the old number is replaced.

3. The apparatus of claim 1, wherein the management unit is further configured to incorporate each of the conversational messages associated with all numbers of the one contact into a single conversational content associated with the one contact.

4. The apparatus of claim 3, wherein, when the corresponding number of the one contact is added to the conversational information associated with the one contact, the management unit is further configured to incorporate the conversational message associated with the corresponding number, before the corresponding number is added, into the single conversational content with the one contact by processing the conversational information associated with the corresponding number before the corresponding number is added.

5. The apparatus of claim 4, wherein the management unit is further configured to set the conversational message associated with the corresponding number which is deleted or replaced in the single conversational content associated with the one contact to be in a non-reply-able status.

6. The apparatus of claim 5, wherein the management unit is further configured to set a certain number of the one contact as a number of the one contact to which a reply message for the one contact is to be sent.

7. The apparatus of claim 6, wherein the certain number is a number corresponding to a last message which is not in the non-reply-able status listed in the single conversational content.

8. The apparatus of claim 6, wherein the certain number is a number corresponding to a message selected by the user among all messages listed in the single conversational content.

9. The apparatus of claim 3, wherein the management unit is further configured to preserve the conversational information associated with the one contact by making the conversational messages associated with the all numbers of the one contact corresponding to a same conversational identification.

10. The apparatus of claim 9, wherein the management unit comprises:
    a number updating unit configured to:
       preserve a correspondence relationship among the conversational identification, the number and the name of the one contact of each conversational message in a time sequence, and
       update the preserved correspondence relationship depending on a change in the corresponding number of the one contact;
    a message updating unit configured to:
       preserve a correspondence relationship among the conversational identification, the number of the one contact, the detailed content and the time of occurrence of each conversational message, and
       update the preserved correspondence relationship depending on the change in the corresponding number of the one contact;
    a conversational entry updating unit configured to:
       preserve a correspondence relationship among the conversational identification of each single conversational content and the time of occurrence and the detailed content of a latest conversational message in the single conversational content, and
       update the preserved correspondence relationship depending on the change in the corresponding number of the one contact; and
    a conversational content forming unit configured to form the conversational content associated with the one contact including a conversational entry message list and a conversational message list based on the correspondence relationships preserved by the number updating unit, the message updating unit and the conversational entry updating unit respectively and the contact information stored by the storage unit.

11. A method for managing conversational content associated with a contact in a terminal, the method comprising:

storing, by a storage unit of the terminal, contact information including a name of each of contacts and a corresponding number;

preserving conversational information associated with one of the contacts, which includes the corresponding number of the one contact, the one contact, a time of occurrence and a detailed content associated with each of conversational messages, and forming a conversational content with the one contact to be displayed for a user based on the contact information and the conversational information; and displaying the formed conversational content with the one contact for the user, wherein the forming of the conversational content further includes incorporating the conversational message associated with the corresponding number of the one contact, before the corresponding number of the one contact is deleted from or replaced in the contact information, into the conversational content associated with the one contact by processing the conversational information associated with the corresponding number of the one contact before the corresponding number is deleted from or replaced in the contact information, such that the conversational message associated with the corresponding number of the one contact is included in the conversational content when the corresponding number of the one contact is deleted or replaced.

12. An apparatus for managing conversational content associated with a contact in a terminal, the apparatus comprising:

a prompting unit configured to:
generate an incorporation prompting message, when a corresponding number of the contact is deleted or replaced, and
output the generated incorporation prompting message;

an instruction receiving unit configured to receive an incorporating instruction for performing an incorporation after the incorporation prompting message is outputted by the prompting unit;

a management unit configured to process conversational information associated with the corresponding number of the contact before the corresponding number is deleted or replaced such that a conversational message associated with the corresponding number before the corresponding number is deleted or replaced is included in the conversational content associated with the contact, when the incorporating instruction is received by the instruction receiving unit; and a display unit configured to display the conversational content with the contact.

13. The apparatus of claim 12,
wherein the prompting unit is further configured to:
generate and output the incorporation prompting message immediately when the corresponding number of the contact is deleted or replaced, or
output the generated incorporation prompting message when the conversational content associated with at least one of the contacts having a number that is deleted or replaced, and wherein the corresponding number which is deleted or replaced and a new contact to which the deleted or replaced number belongs is displayed by the display unit after the corresponding number of the contact is deleted or replaced.

14. The apparatus of claim 12,
wherein the prompting unit is further configured to:
generate a notification message for informing a user that the corresponding number is deleted from the contact or is replaced, and
output the generated notification message when the conversational content associated with at least one of the contacts having a number that is deleted or replaced, and wherein the corresponding number which is deleted or replaced and the new contact to which the deleted or replaced number belongs is displayed by the display unit.

15. The apparatus of claim 14, wherein the incorporation prompting message or the notification message is embedded in the conversational content or placed in a separate window.

16. The apparatus of claim 14, wherein the prompting unit is further configured to output an entry for linking to the conversational message associated with the deleted or replaced number or an entry for linking to the conversational message associated with the contact having a number that is deleted or replaced, when outputting the incorporation prompting message or the notification message.

17. The apparatus of claim 12, wherein the display unit is further configured to distinguish the conversational message from the corresponding number before the corresponding number is deleted or replaced from another conversational message in the conversational content associated with the contact while displaying the conversational content associated with the contact.

18. The apparatus of claim 12, wherein, when the incorporating instruction is not received by the instruction receiving unit, the display unit is further configured to distinguish the conversational message from the corresponding number before the corresponding number is deleted or replaced from another conversational message in the conversational content associated with the new contact to which the deleted or replaced number belongs while displaying the conversational content associated with the new contact.

19. A method for managing conversational content associated with a contact in a terminal, the method comprising:

generating, by a prompting unit of the terminal, an incorporation prompting message, when a corresponding number of the contact is deleted or replaced, and outputting the generated incorporation prompting message;

receiving an incorporating instruction for performing an incorporation after the incorporation prompting message is outputted;

processing conversational information associated with the corresponding number of the contact before the corresponding number is deleted or replaced, when the incorporating instruction is received such that a conversational message associated with the corresponding number before the corresponding number is deleted or replaced is included in the conversational content associated with the contact; and displaying the conversational content with the contact.

20. The method of claim 19,
wherein the generated incorporation prompting message requests a user to indicate whether or not to incorporate the conversational message associated with the corresponding number, wherein when, in response to the incorporation prompting message, the user indicates to incorporate the conversational message, the method performs the processing of the conversational information, and wherein when, in response to the incorporation prompting message, the user indicates to not incorporate the conversational message, the method does not include the conversational message associated with the corresponding number in the conversational content associated with the contact.

* * * * *